Nov. 12, 1935.　　　G. A. BUTTRESS　　　2,020,721
BOTTLE CAPPING MACHINE
Filed Nov. 27, 1934　　　25 Sheets-Sheet 1

Inventor
George A. Buttress
By
R. S. Berry
Att'y.

Nov. 12, 1935.  G. A. BUTTRESS  2,020,721
BOTTLE CAPPING MACHINE
Filed Nov. 27, 1934  25 Sheets-Sheet 2
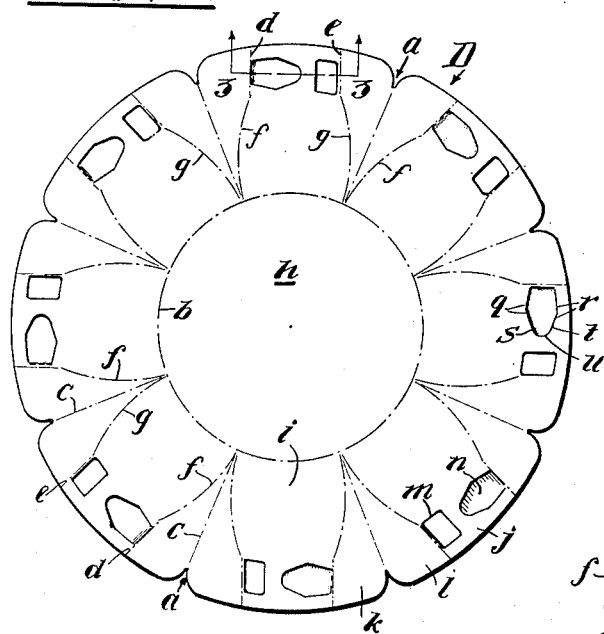
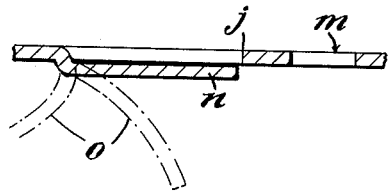
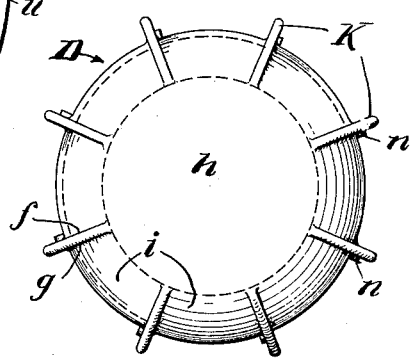
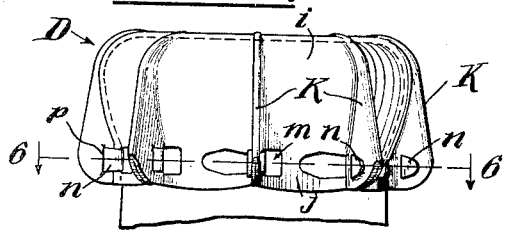
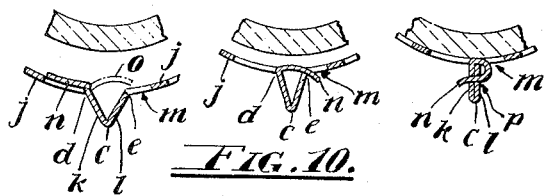
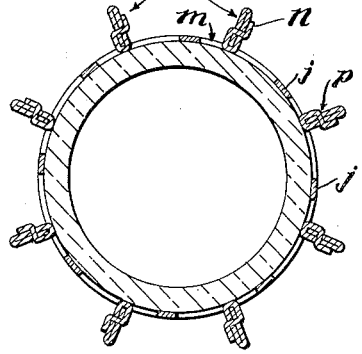
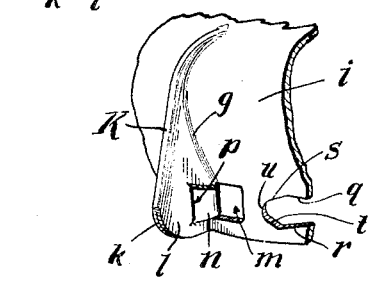
Inventor
George A. Buttress
By
R. S. Berry
Att'y.

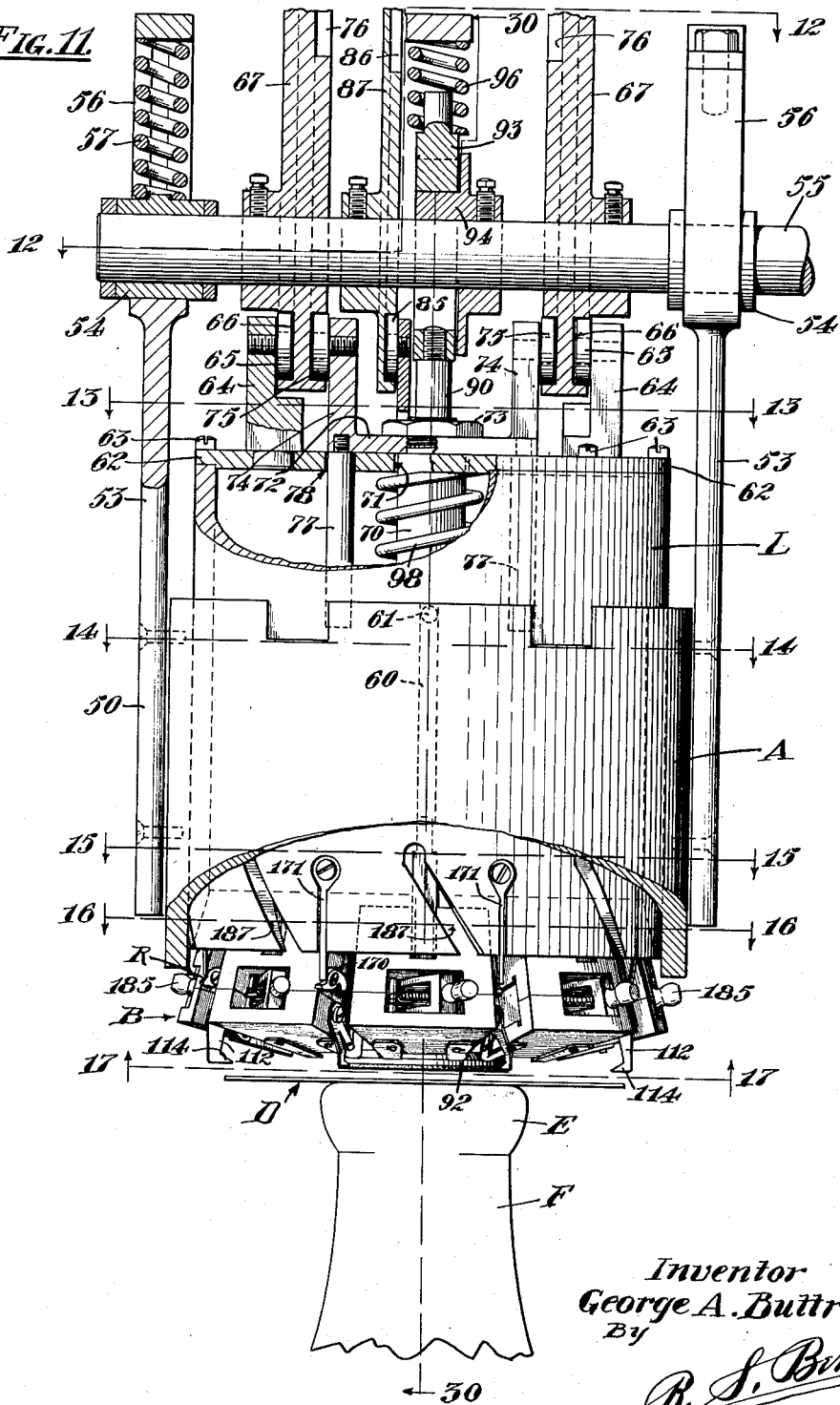

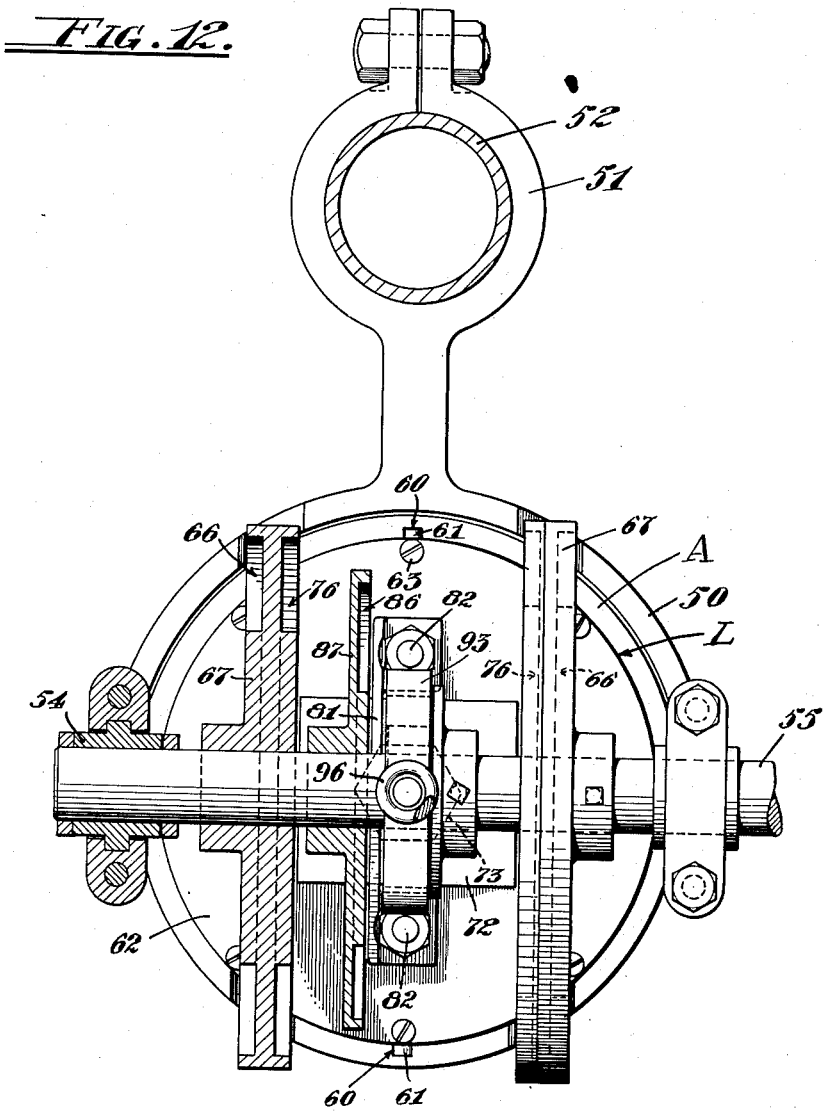

Nov. 12, 1935.  G. A. BUTTRESS  2,020,721
BOTTLE CAPPING MACHINE
Filed Nov. 27, 1934   25 Sheets-Sheet 5

Inventor
George A. Buttress
By
R. S. Bump
Att'y.

Inventor
George A. Buttress
By
Att'y.

Nov. 12, 1935.  G. A. BUTTRESS  2,020,721
BOTTLE CAPPING MACHINE
Filed Nov. 27, 1934  25 Sheets-Sheet 7
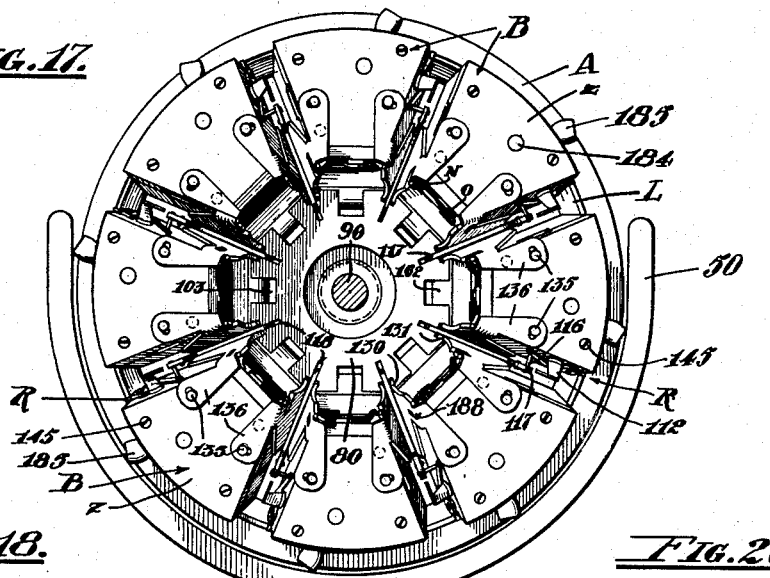
Inventor
George A. Buttress
By
R. S. Berry
Att'y.

Nov. 12, 1935.  G. A. BUTTRESS  2,020,721
BOTTLE CAPPING MACHINE
Filed Nov. 27, 1934  25 Sheets-Sheet 8
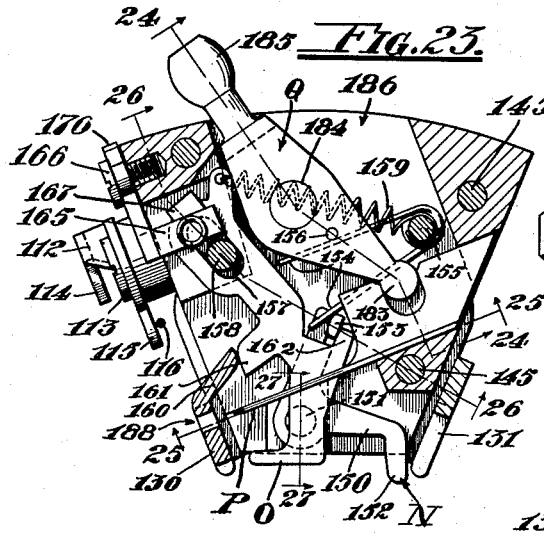
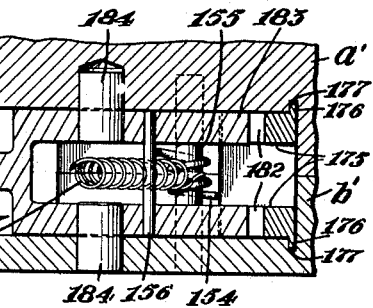
Inventor
George A. Buttress
By
R. S. Burry
Att'y.

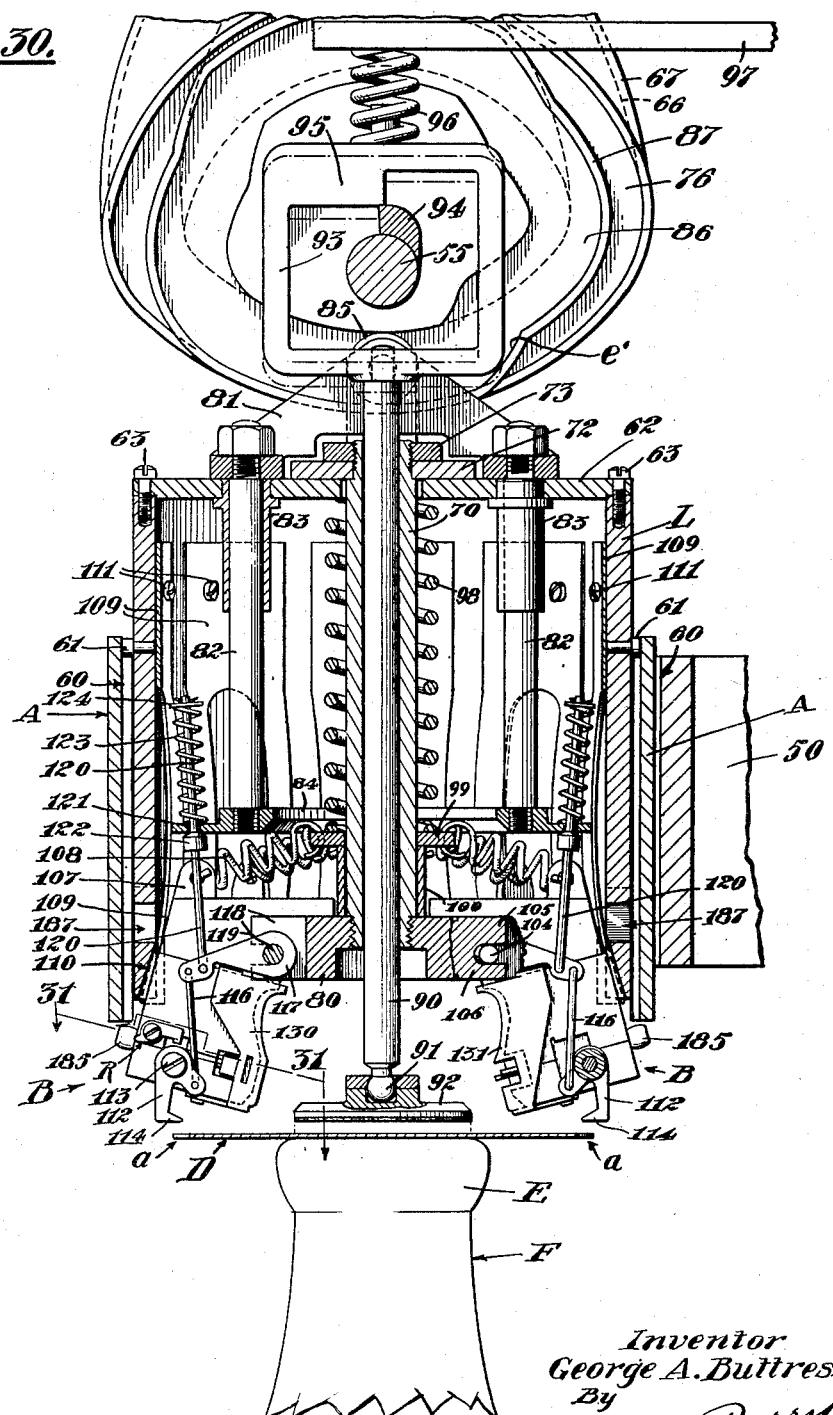

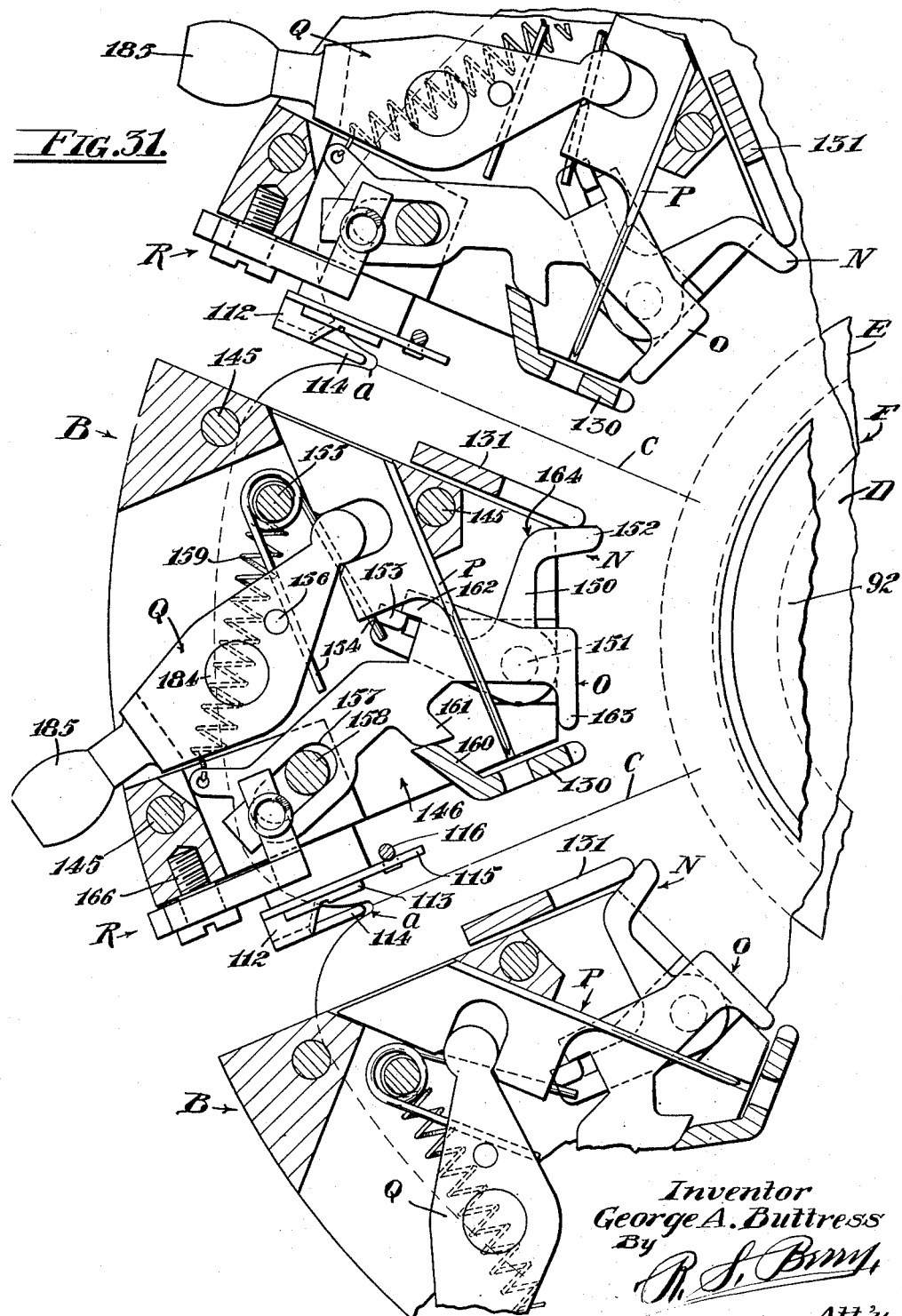

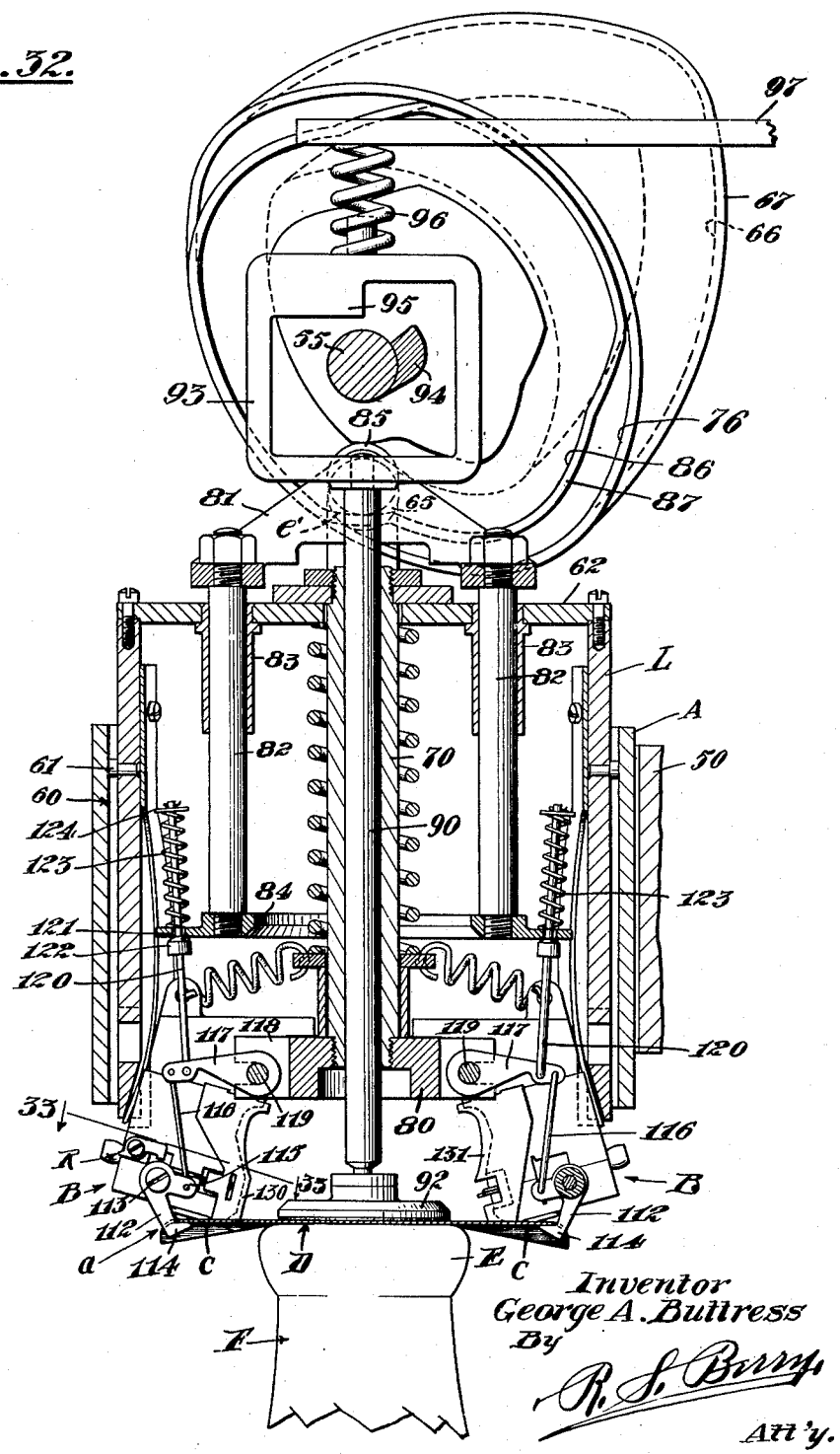

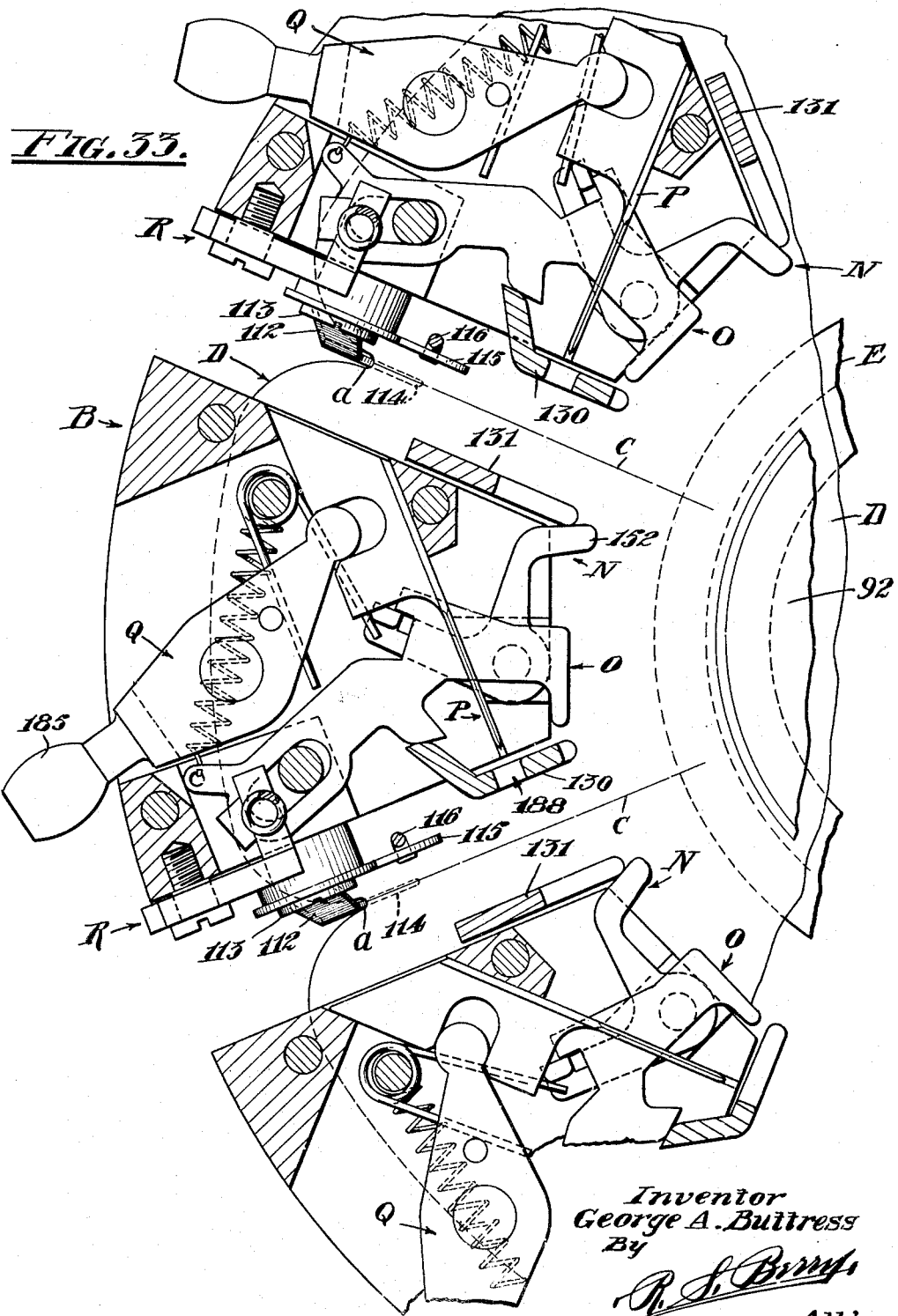

Nov. 12, 1935.  G. A. BUTTRESS  2,020,721
BOTTLE CAPPING MACHINE
Filed Nov. 27, 1934   25 Sheets-Sheet 13

Inventor
George A. Buttress
By
R. S. Berry
Att'y.

Nov. 12, 1935.  G. A. BUTTRESS  2,020,721
BOTTLE CAPPING MACHINE
Filed Nov. 27, 1934  25 Sheets-Sheet 18

Inventor
George A. Buttress
By
R. S. Berry
Att'y.

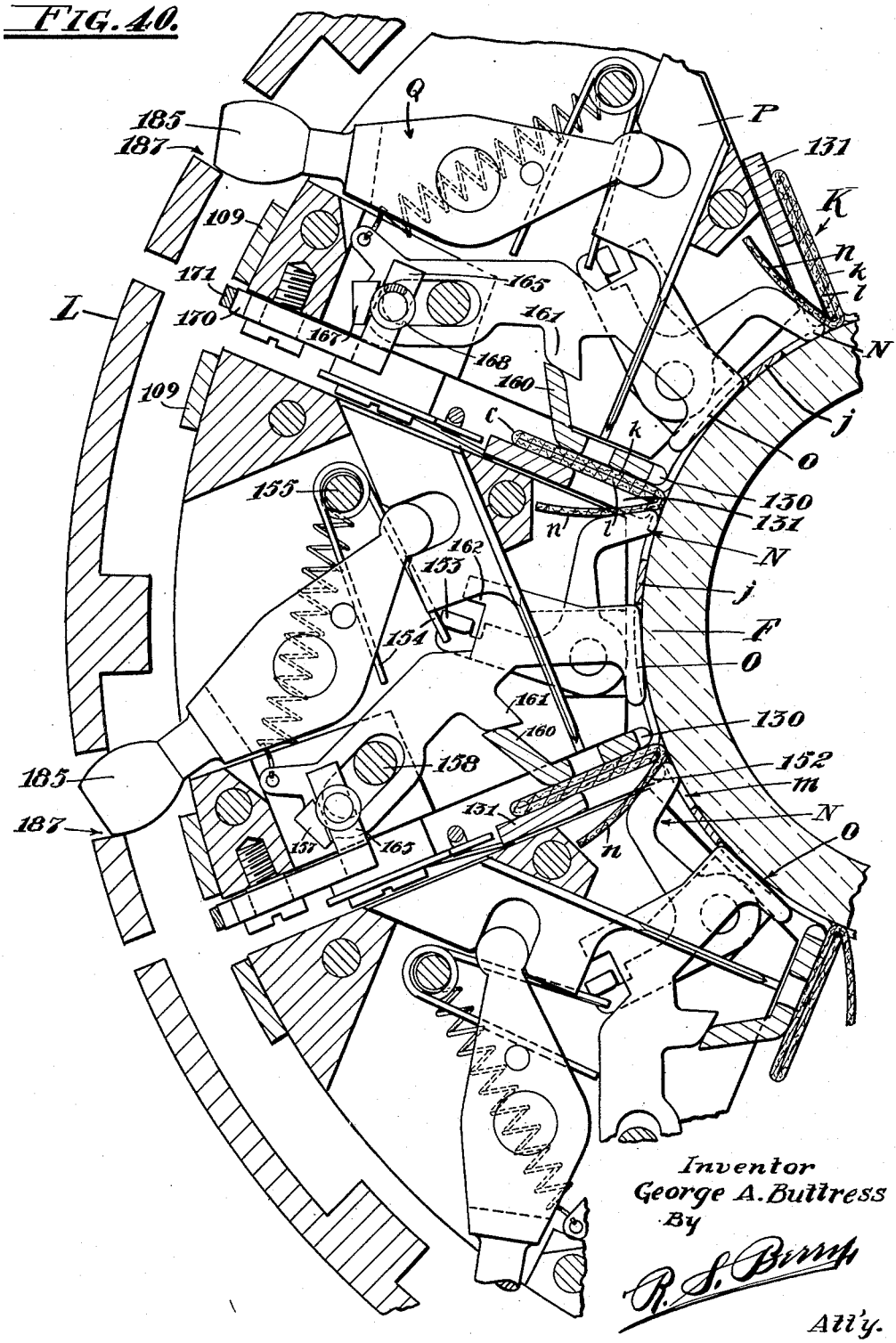

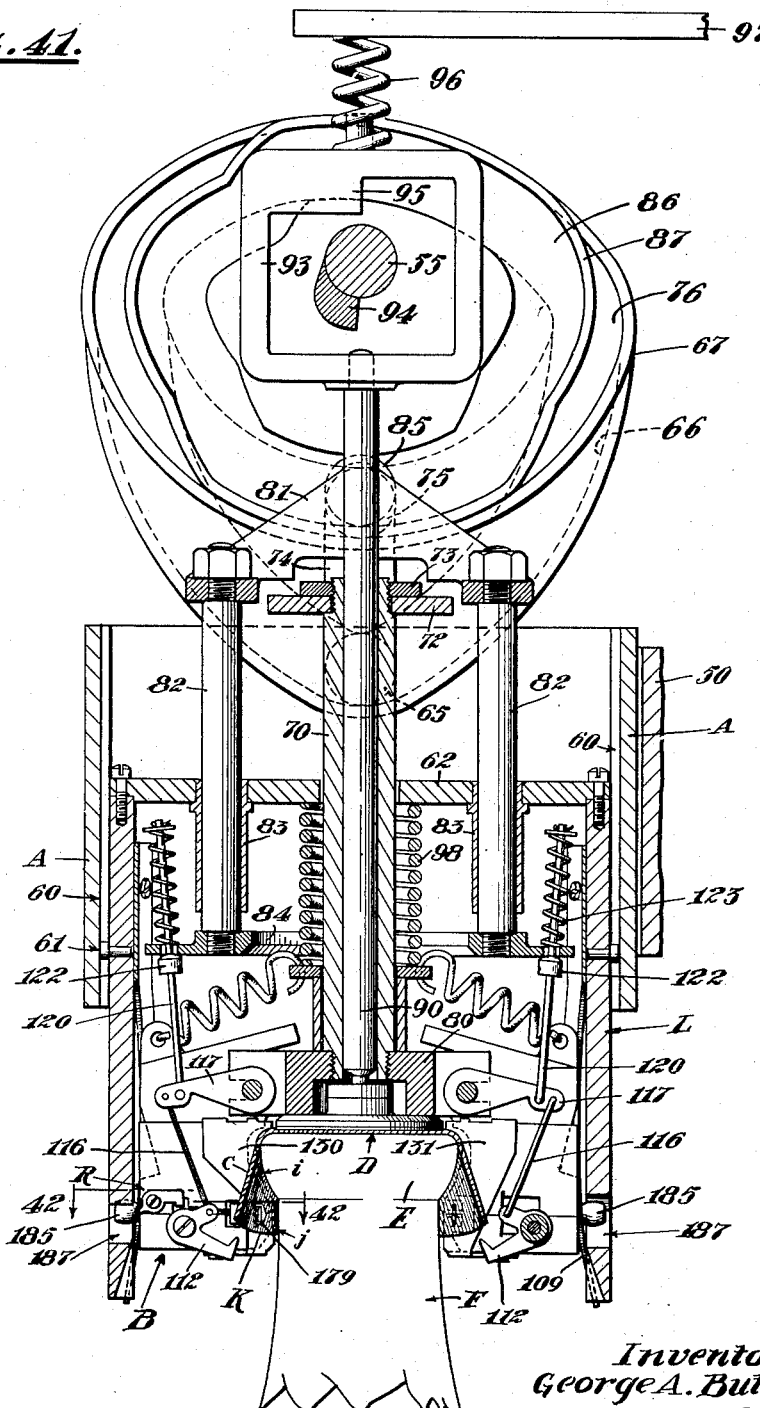

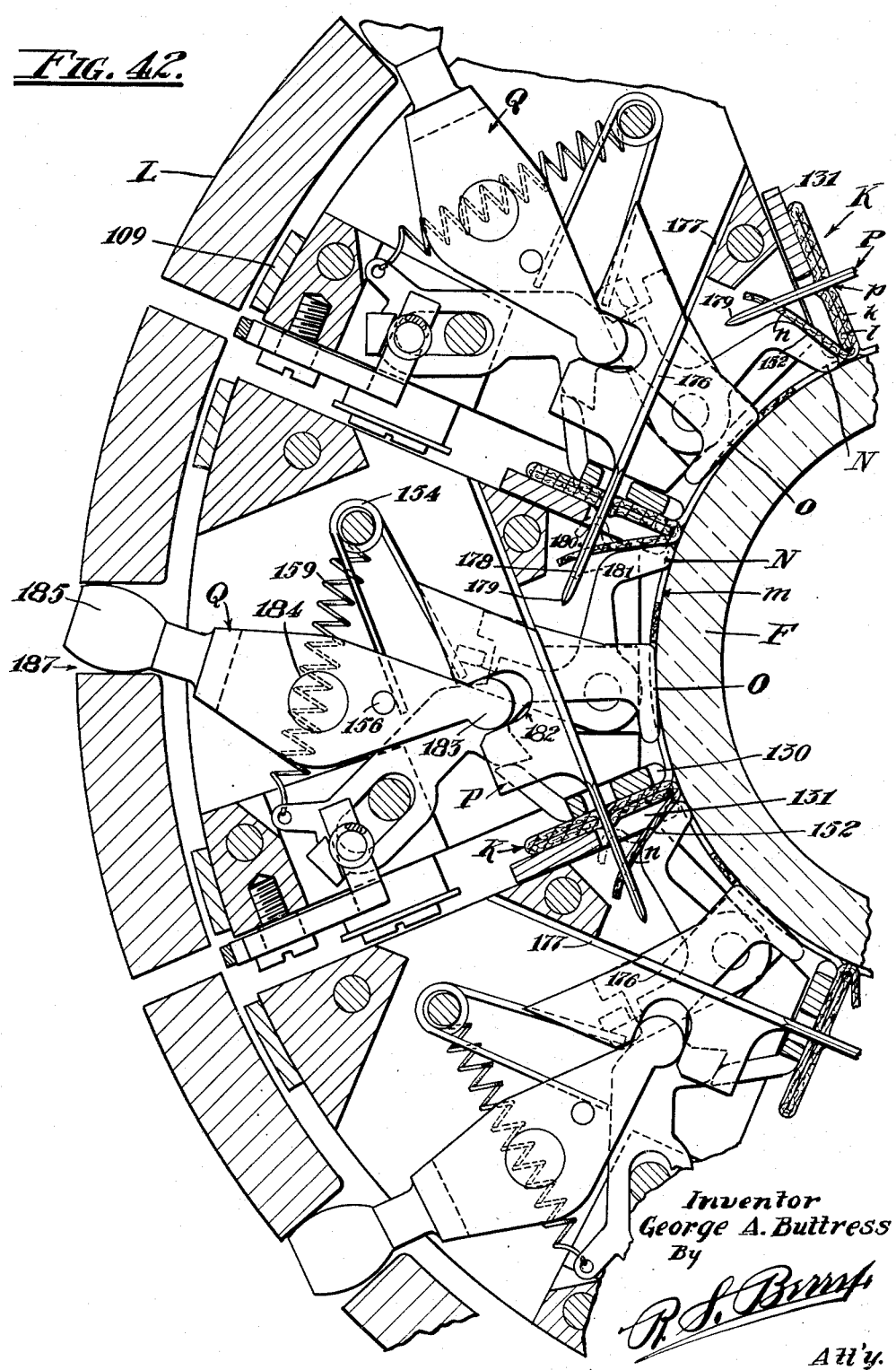

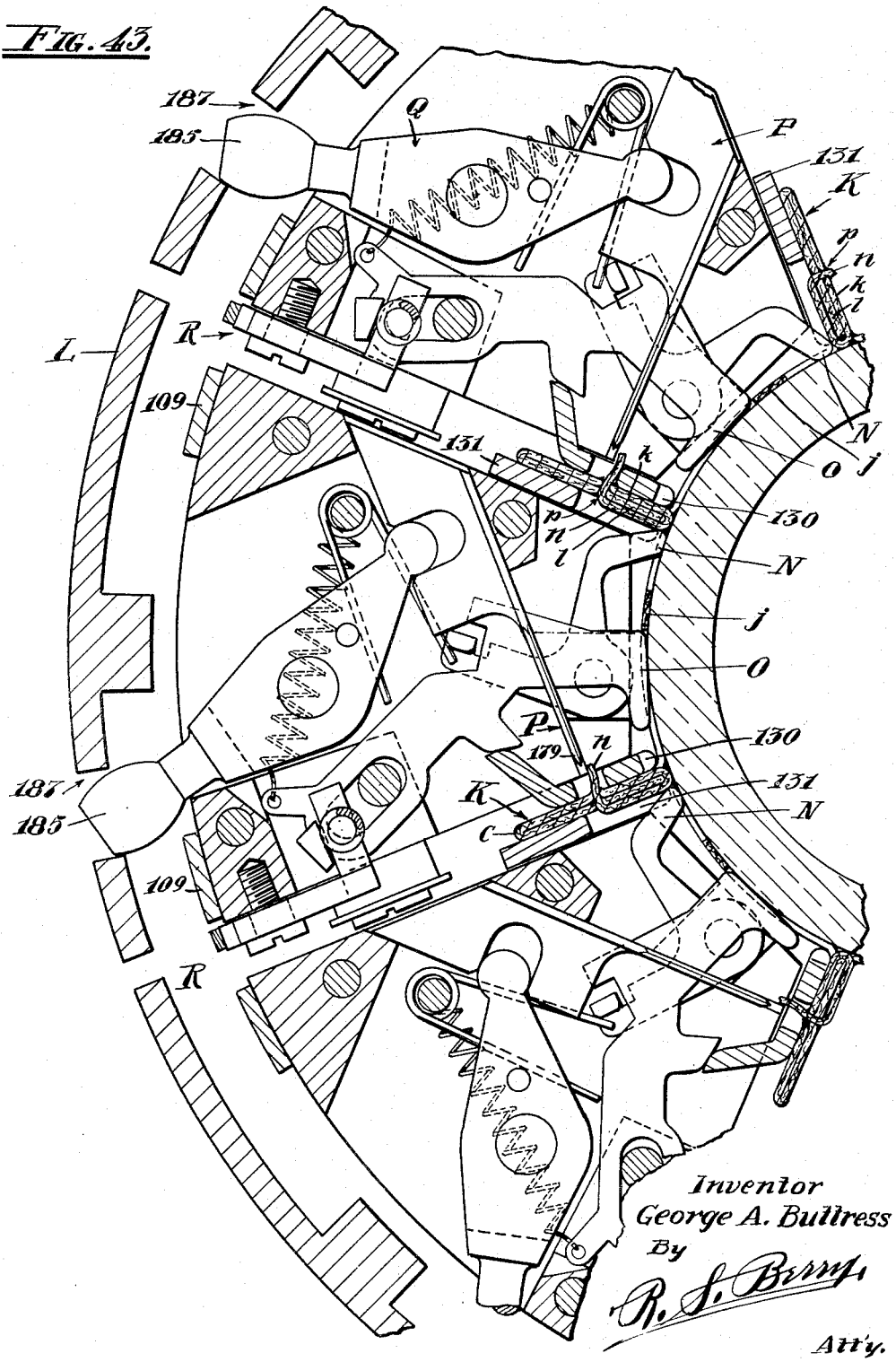

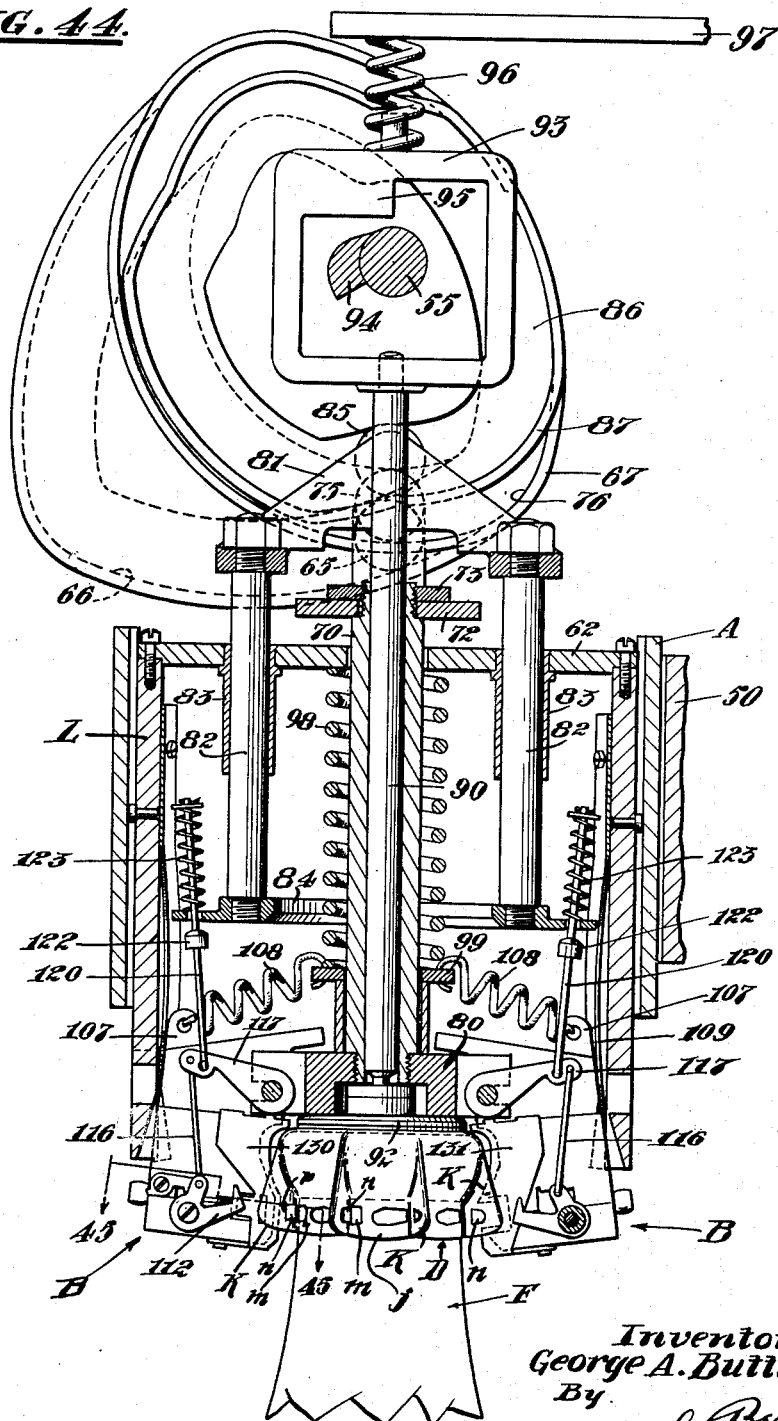

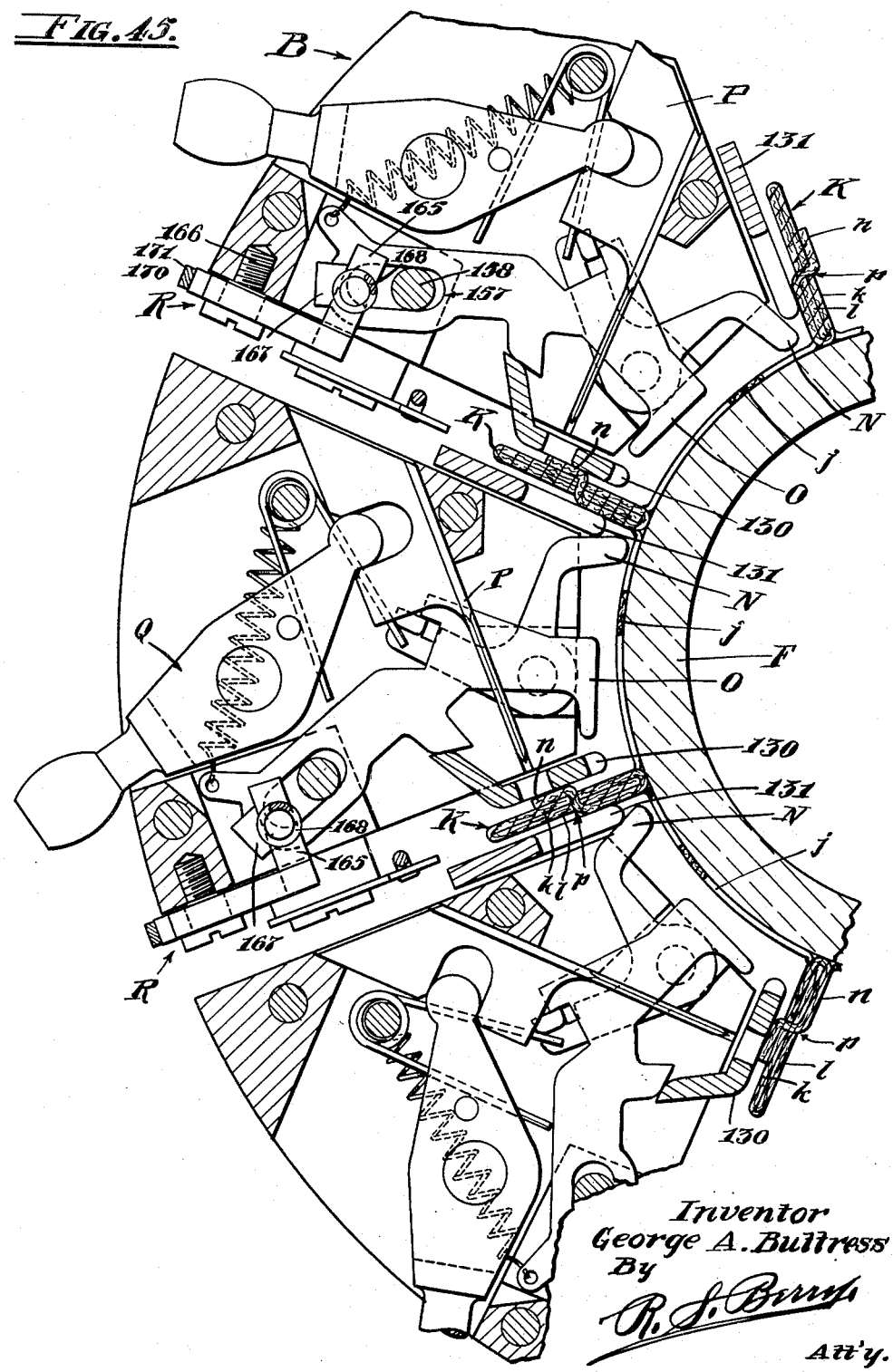

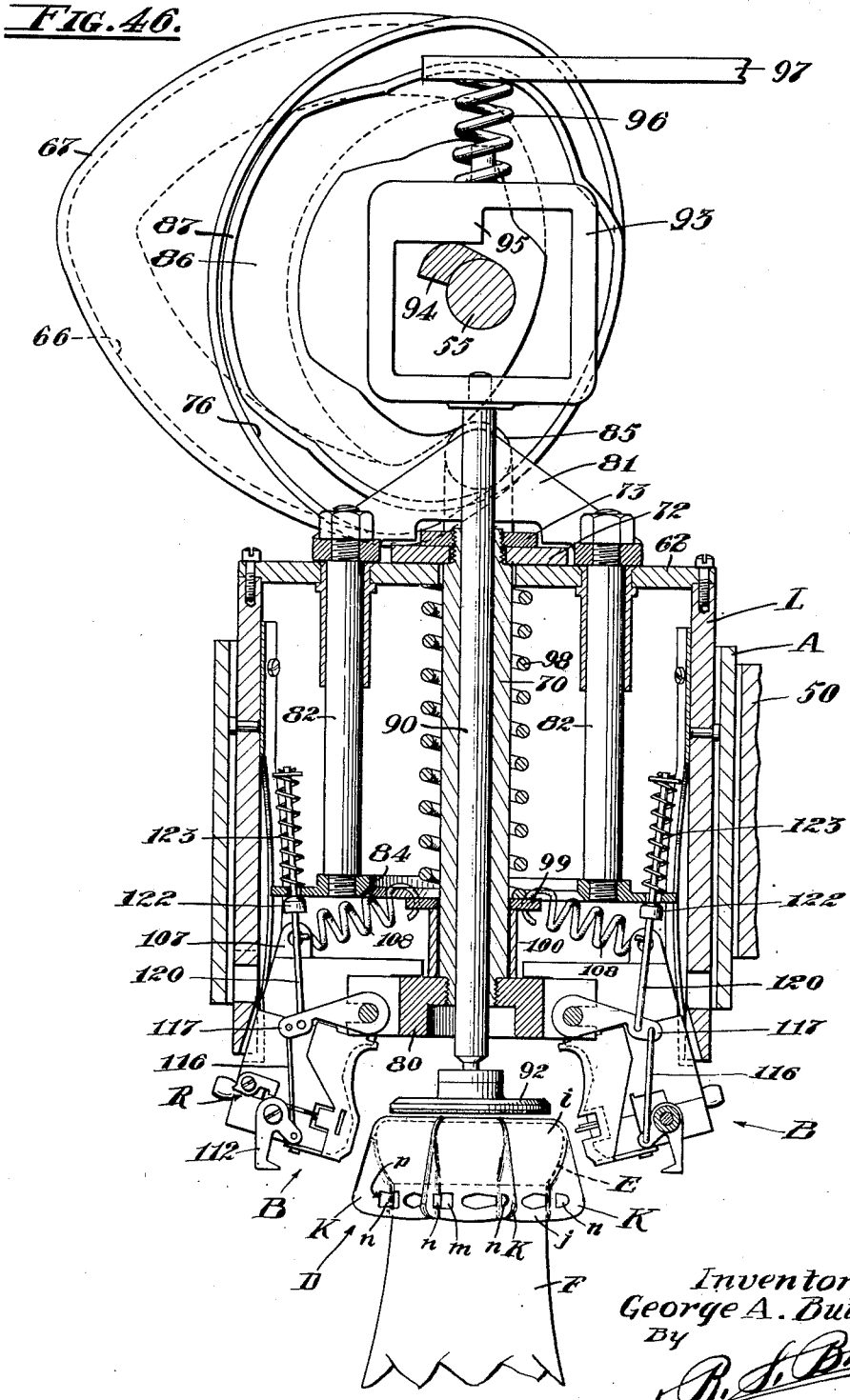

Patented Nov. 12, 1935

2,020,721

UNITED STATES PATENT OFFICE 2,020,721

BOTTLE CAPPING MACHINE

George A. Buttress, Los Angeles, Calif., assignor to Lonroy Corporation, Los Angeles, Calif., a corporation of California Application November 27, 1934, Serial No. 755,019

19 Claims. (Cl. 226—81)

This invention relates to a bottle capping machine, and more particularly pertains to a machine for applying fibrous caps to milk bottles, and the like, which is especially adapted to effect application to a bottle of a closure of the type set forth in my co-pending application for Letters Patent, Ser. No. 729,237, filed June 6, 1934, and which closure or cap embodies initially a flat blank formed of paper, cardboard, pulp board or the like, and which blank is adapted to be applied over the mouth of a bottle and conformed to the rim thereof by an operation which involves the formation of a series of pleats projecting radially from the side portion of the cap and also involves the threading of a tongue struck from the blank through slits formed in the overlying walls of the pleats in such fashion as to securely hold such walls against separation and thereby maintain the cap in place on the bottle.

An object of the invention is to provide a machine of the above character embodying a capping mechanism to which bottles and the cap blanks may be rapidly fed and the capping mechanism actuated to effect formation and application of the cap on the rim of the bottle.

A particular object of the invention is to provide a construction in the capping mechanism whereby the marginal portion of the blank will be caused to substantially conform to the outer face of the bottle rim and including a means for effectively forming the radial pleats in such fashion as to take up slack in the paper cap and cause the paper to snugly fit the outer periphery of the cylindrical portion of the bottle neck adjacent the rim of the latter without materially stretching the material of the cap.

Another object is to provide a means in capping mechanism whereby tongues formed in the cap adjacent the margins thereof may be bent rearwardly from the apron portion of the cap during formation of the latter and reversed in the direction of their extension circumferentially of the bottle neck and then brought forwardly through perforations in the blank so as to extend astride the inner marginal portions of the adjacent side walls of the radial folds.

Another object is to provide a means in the capping mechanism whereby the outwardly protruding tongues above referred to will be threaded through slits in the overlying side walls of the pleats in a manner to effectively tie the side walls of the pleats together against ready separation.

Another object is to provide a means in the capping mechanism whereby during the action on the tongues, above described, the side walls of the pleats will be drawn closely together and the marginal portion of the cap drawn taut to tightly conform to the cylindrical contour of the bottle neck adjacent the lower margin of the rim thereof.

Another object is to provide a construction and arrangement in the capping mechanism whereby the formation of the plurality of pleats will be simultaneously performed and likewise the action on the tongues in effecting tying of the side walls of the several pleats together will be simultaneously accomplished so that the entire operation of applying the cap and securing it in place on the bottle neck may be rapidly done.

Another object is to provide a means in the capping mechanism for holding the several individual pleats or folds in their radially extended position during the operation of bending and interconnecting the tongues therewith so as to prevent collapsing or distorting of the pleats and insuring proper engagement of the tongues therewith.

Another object is to provide an effective means for slitting the overlying folds or walls of the pleats which will also serve as a means for threading the tongues through the formed slits.

A particular feature of the invention resides in the arrangement and coordination of the various parts of the cap forming and applying mechanism, together with the actuating mechanism therefor, whereby the proper timing of the successive operations is obtained, and whereby the possibility of jamming is reduced to a minimum.

Another object is to provide in the capping mechanism an assemblage of a plurality or multiple of complementary cooperating units arranged to be positioned to encompass the bottle cap and rim, in which the units are separately detachable and removable from a head carrying same to facilitate adjustments and repairs.

Another object is to provide an effective means for actuating the multiple of units collectively in applying the cap to the bottle and in disengaging the cap forming and applying mechanism from the formed cap and restoring the capping mechanism to normal in readiness for further operation.

Various additional objects and features of the invention will appear and will be more fully understood from the following detailed description of a present preferred embodiment thereof, reference for this purpose being had to the accompanying drawings, in which:

Fig. 2 is a plan view of the bottle cap blank showing it as formed preparatory to application to a bottle;

Fig. 3 is a detail in section taken on the line 3—3 of Fig. 2 showing the tongue and slot construction and illustrating in dotted lines the manner in which the tongue is to be subsequently bent to extend in an opposite direction;

Fig. 4 is a plan view of the bottle cap showing it as applied;

Fig. 5 is a view of the cap as seen in side elevation when applied;

Fig. 6 is a view in horizontal section taken on the line 6—6 of Fig. 5 showing the manner in which the side walls of the pleats of the bottle caps are interconnected together by the bent tongues;

Figs. 7, 8 and 9 are diagrams in section illustrating the steps employed in effecting interconnection of the side walls of the pleats by the bent tongues;

Fig. 10 is a detail in perspective of a fragmentary portion of the cap depicting the manner of tying the pleats with the bent tongues;

Fig. 11 is a view in section and elevation as seen on the line 11—11 of Fig. 1 in the direction indicated by the arrows with portions broken away, showing the parts as positioned in readiness for applying a cap to a bottle;

Fig. 12 is a horizontal section and plan view taken on the line 12—12 of Fig. 11 showing the actuating mechanism;

Fig. 17 is an inverted plan view taken on the line 17—17 of Fig. 11 showing the lower end of the capping mechanism with the several units and parts in their normal position preparatory to applying a cap;

Fig. 18 is a perspective view of one of the cap forming units as seen from one side thereof and showing its inner face;

Fig. 19 is a perspective view of one of the units as seen from the inner side thereof;

Fig. 20 is a perspective view of one of the units as seen from the outer side thereof, and showing the side face opposite that seen in Fig. 19;

Fig. 21 is a section and plan view of one of the units taken on the line 21—21 of Fig. 19;

Fig. 22 is a detail in section taken on the line 22—22 of Fig. 21;

Fig. 23 is a view in horizontal section of one of the units as seen approximately on the plane indicated by the line 23—23 of Fig. 19;

Fig. 24 is a detail in section taken on the line 24—24 of Fig. 23 as seen in the direction indicated by the arrows;

Fig. 25 is a view in vertical section and elevation taken on the line 25—25 of Fig. 28, showing the combined slit forming and tongue threading needle as viewed from the inner side thereof;

Fig. 26 is a detail in section and elevation taken on the line 26—26 of Fig. 23 as seen in the direction as indicated by the arrows;

Fig. 27 is a detail in section taken on the line 27—27 of Fig. 24;

Fig. 28 is a perspective view of the needle as viewed from the outer side thereof and opposite that shown in Fig. 26;

Fig. 29 is a detail in section taken on the line 29—29 of Fig. 21;

Fig. 30 is a view in section and elevation taken on the line 30—30 of Fig. 11, as seen in the direction indicated by the arrows;

Fig. 31 is a horizontal section and plan view of a fragmentary portion of the capping mechanism taken approximately on the line 31—31 of Fig. 30 showing the parts in their normal position in readiness for commencement of operation on the bottle cap;

Fig. 32 is a view in section and elevation similar to Fig. 30, showing the parts as disposed in effecting initial engagement with the bottle cap;

Fig. 33 is a view in horizontal section and plan as seen approximately on the line 33—33 of Fig. 32, showing a fragmentary portion of the capping mechanism with the parts disposed on initial engagement with the bottle cap blank;

Fig. 40 is a view in horizontal section and plan similar to Fig. 39, but showing the parts as positioned on completion of the formation of the pleats and the fastening of the tongues at the inner margins of the pleats;

Fig. 41 is a view in section and elevation similar to Fig. 38, showing the parts as positioned with the lip forming tongue engaging needle in its advanced position;

Fig. 42 is a view in section and plan taken on the line 42—42 of Fig. 41, showing the needles in their advanced positions and engaged with the tongues and in readiness to be retracted;

Fig. 43 is a view in section and plan similar to Fig. 42, showing the needles in their retracted position, and with the parts as disposed after having drawn the tongues through the slits in the pleats.

Fig. 44 is a view in section and elevation similar to Fig. 41, showing the parts as positioned at the completion of the formation of the pleats and the interconnection of the tongues therewith and just previous to disengagement of the capping mechanism from the completed cap;

Fig. 45 is a view in horizontal section and plan taken on the line 45—45 of Fig. 44;

Fig. 46 is a view in section and elevation similar to Fig. 44, showing the parts as positioned on disengagement of the capping mechanism from the formed bottle cap and in readiness for return to the normal position shown in Fig. 11.

Figure 1:
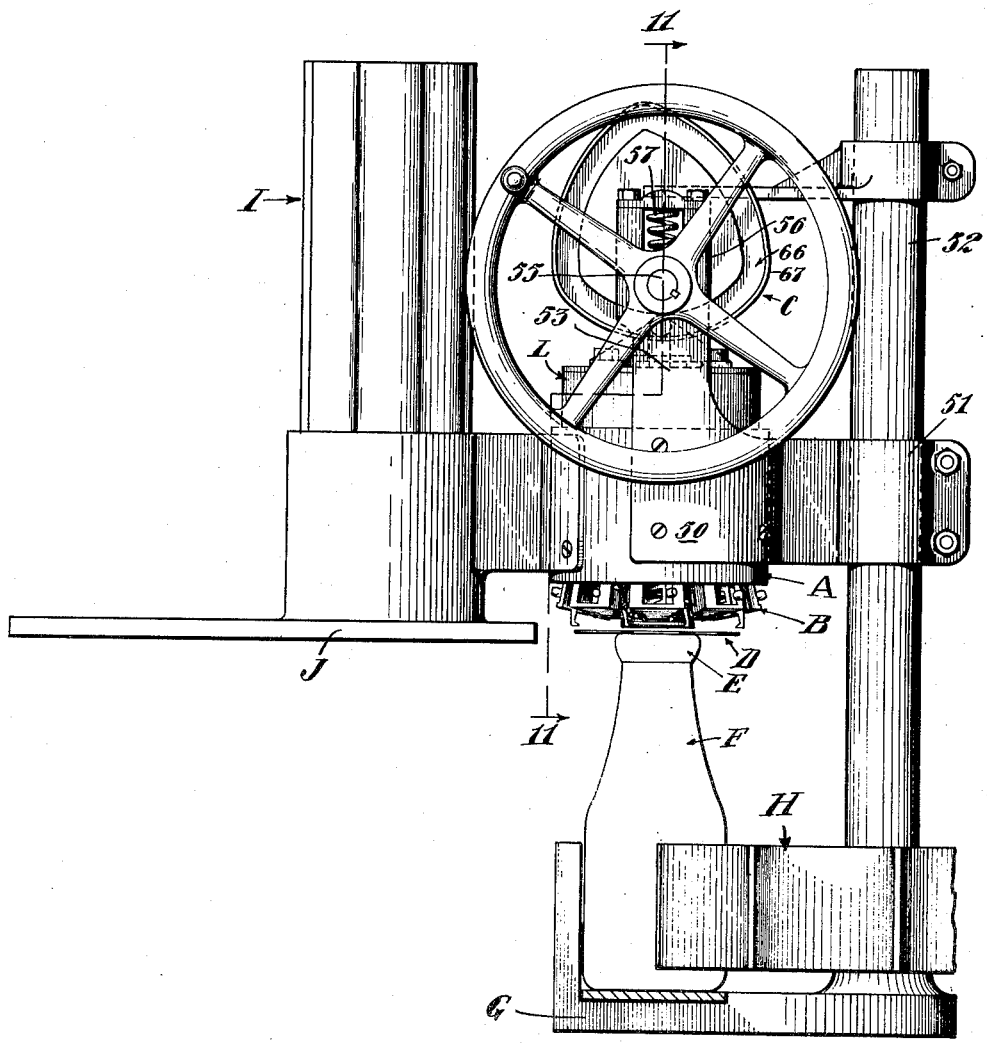
Fig. 1 is a view of the capping machine as seen in side elevation.
Figure 13:
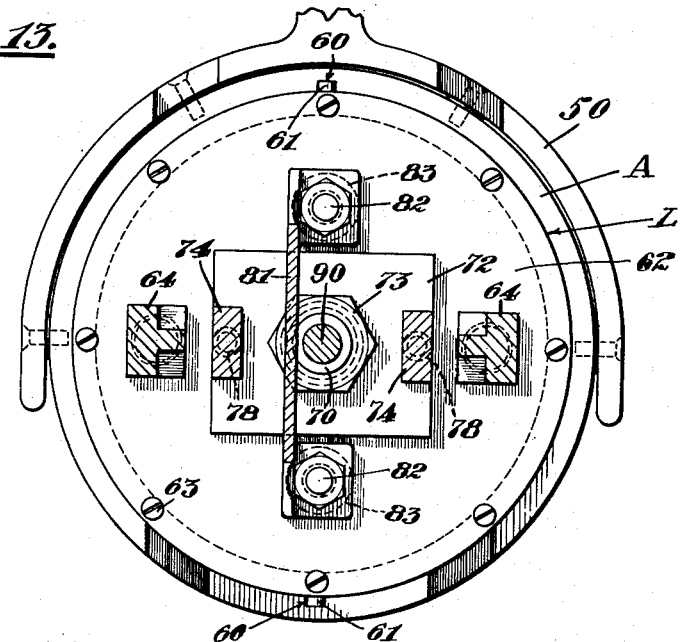
Fig. 13 is a view in horizontal section and plan as seen on the line 13—13 of Fig. 11.
Figure 14:
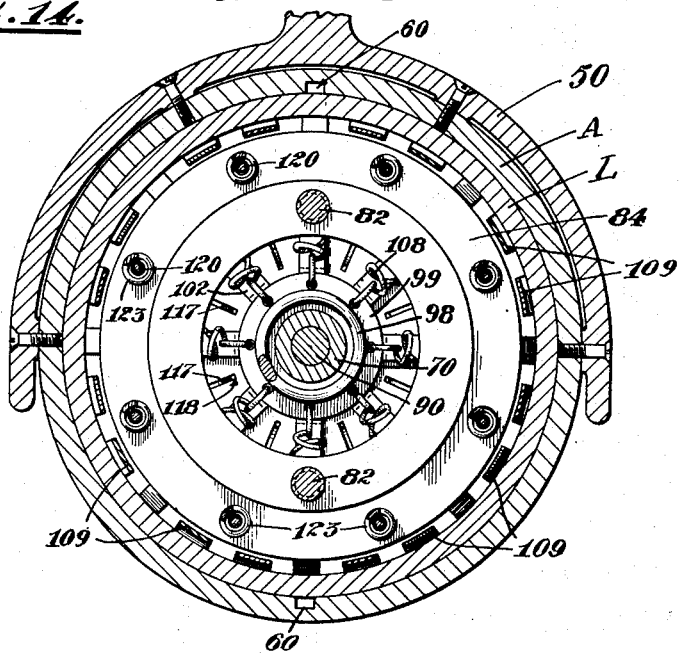
Fig. 14 is a detail in cross section and plan as seen on the line 14—14 of Fig. 7.

Referring to the drawings more specifically, in which corresponding reference characters indicate corresponding parts throughout the several views, reference now being had to Fig. 1, A indicates generally the head of the machine on which is carried a series of bottle capping units B and which head is supported on a yoke 50 formed on a bracket 51 carried on a standard 52; the yoke 50 being formed with upstanding extensions 53 on which are carried journal boxes 54 supporting a revoluble shaft 55. The shaft 55 carries cam mechanism, indicated generally at C, which is designed to actuate the capping units B as will be later described to effect application of a bottle cap D to the rim E of a bottle F positioned on a platform G beneath the capping mechanism; the bottles being designed to be fed intermittently to the capping mechanism by a star wheel H in a manner common in bottle capping machinery.

The bottle caps D are initially in the form of substantially circular flat blanks, as shown in Fig. 2, arranged in a stack in a magazine I, and fed by a suitable mechanism in a housing J (not necessary to be here shown) to a seated position on the upper margin of the bottle rim E and in a position to be engaged and operated on by the capping mechanism whereby the marginal portions of the blank D will be bent downwardly over the rim E and at the same time formed with pleats K, as shown in Figs. 4 and 5.

The cap blank D comprises a flexible sheet of fibrous material which is substantially circular in outline and formed with a series of equally spaced V-shaped notches $a$ throughout its margin and is formed with an arrangement of fold lines to facilitate its application to the bottle by bending the marginal portions thereof over the rim of the bottle mouth, then extending said marginal portions of the sheet alongside of the neck of the bottle, and at the same time form the series of pleats K extending radially from the formed cap.

As here shown, the sheet is formed with a circular fold line $b$ disposed concentrically of the sheet, and having a diameter substantially corresponding to the outside diameter of the bottle rim, and extending radially from the circular fold line is a series of fold lines $c$, here shown as spaced forty-five degrees apart and leading from the circular fold line $b$ to the apex of the V-notches $a$. Leading inwardly from the margin of the sheet on opposite sides of the radial fold lines $c$ in inwardly inclined or diagonal relation to the latter are short, straight fold lines $d$ and $e$ and leading from the inner ends of the fold lines $d$ and $e$ are arcuate fold lines $f$ and $g$ which curve inwardly towards the fold lines $c$ and terminate adjacent the inner ends of the latter contiguous the circular fold line $b$.

The several fold lines are formed by either scoring or crimping the sheet and may be formed during the course of constructing the sheet when forming it with punches and dies.

The area $h$ encircled by the fold line $b$ is designed to extend over the bottle mouth while the areas $i$ and the continuing areas $j$ extending between the adjacent fold lines $g$ and $f$ and $e$ and $d$ are designed to be extended downwardly over the rim of the bottle and around a contiguous portion of the cylindrical bottle neck, as particularly shown in Fig. 5; and the areas $k$ and $l$ extending between the radial fold lines $c$ and the fold lines $f$—$g$ and $d$—$e$, respectively, are designed to be folded to extend close together when the cap is applied to the bottle and when thus folded will provide the series of radially extending pleats K.

The blank D is formed with rectangular openings $m$ in the areas $j$ with one side margin of each of the openings extending adjacent a fold line $e$, and its outer end margin spaced a short distance from the margin of the sheet, while its inner end margin is disposed contiguous the outer end of the fold lines $g$.

Struck from each area $j$ is a tongue $n$, which tongue leads from the fold line $e$ towards the opening $m$ and has its outer end terminating a short distance from the latter, as particularly shown in Fig. 2. The tongue thus initially formed normally projects parallel with the plane of the sheet, but is designed to be bent rearwardly, as indicated by the dotted lines $o$ in Figs. 3 and 7, and to be brought through the opening $m$ on the opposite side of the pleat K, as shown in Fig. 8, and to have its outer end brought back through the overlying areas $k$ and $l$ of the pleat K, as shown in Figs. 6, 9 and 10.

In thus connecting the tongue $n$ with the side members of the pleat, the side members are punctured to form an elongated slit $p$ extending longitudinally of the pleat, as shown in Fig. 10.

Each of the tongues $n$ is formed of gradually increased width from the base thereof; its sides flaring outwardly, as indicated at $q$ and $r$ to a point about midway of the length of the tongue, while the outer end portion of the tongue has its sides converging, as indicated at $s$ and $t$ and terminating in a blunt rounding end $u$. The slit $p$ is formed of a length slightly less than the width of the tongue $n$ at its widest point; the tongue being designed to be bent transversely as it is forced through the slit to position the enlarged end portion of the tongue protruding through the pleat K so as to act as a lock to tie the side members of the pleat together and offer considerable resistance to withdrawing of the tongue out of engagement with the pleat.

In order to facilitate understanding of the description and operation of the capping mechanism involving the invention herein, the mode of forming and fastening of the cap on the bottle rim will now be briefly stated, and is as follows:

After the cap blank D has been applied to the bottle top with the marginal portion of the cap protruding from the rim or mouth of the bottle, such marginal portion is forced downwardly to its position around the neck of the bottle by bending the blank along its several fold lines, which by reason of being formed and arranged as herein set forth, the formed cap will closely conform to the contours of the bottle rim and the contiguous portion of the neck thereof. Coincident with the folding operation, whereby the pleats K are formed, the tongues $n$ are bent rearwardly and passed through the openings $m$ and through the slits $p$ in the fashion shown in Figs. 6, 7, 8 and 9; the operation of threading the tongues through the pleats acting to draw the marginal portions of the cap into intimate contact with the outer periphery of the bottle neck. The ends of the tongues are bent outwardly after passing through the slits which with the action of the enlargement thereof securely fastens the cap in place.

Referring to Figs. 1 and 11 it will be seen that the bearings 54 of the shaft 55 are carried in yokes 56 on the uprights 53 and are maintained seated in the yokes under the urge of springs 57 bearing downwardly thereon and which springs serve to permit yieldable upward movement of the bearings 54 and shaft 55 under excessive upward thrusts imposed on the shaft.

Referring now to Figs. 11 and 30 in which the cap forming and applying mechanism is depicted on its normal position, that is, in readiness for operation to effect application of the bottle cap blank D to the bottle rim E, L indicates a vertically reciprocal cylinder carried by the head A which latter encircles the cylinder L in slidable contact therewith to form a guide therefor; the head A being formed with vertical channels 60 on diametrically opposite sides of its inner periphery engaged by projection 61 on the cylinder L whereby the latter is held against rotation relative to the head A.

The cylinder L is closed at its upper end by a wall 62 rigidly secured in place by screws 63. Connecting with the wall 62 is a pair of hangers 64 fitted with vertically extending rollers 65 engaged in cam grooves 66 formed on the outer side faces of a pair of spaced cam discs 67 affixed to the shaft 55 whereby the cylinder L is suspended from the cam discs and is reciprocated vertically on rotation of the shaft 55 and discs 67. The cam grooves 66 have an eccentric contour, as particularly shown in Fig. 1, being substantially heart shape, to effect reciprocation of the cylinder on each revolution of the shaft 55 with rapid downward movement at the beginning of the downstroke and with gradually slowing movement approaching the end of the downstroke, and with slow motion on the start of its upstroke and with more rapid movement at the upper portion of its upstroke with a near dwell at the termination of the upstroke.

Extending axially of the cylinder L is a tubular stem 70 the upper end portion of which projects through an opening 71 in the wall 62 and is affixed to a cross head 72 by a nut 73, and which cross head is formed on a pair of hangers 74 fitted with vertical rollers 75 engaged in cam grooves 76 on the adjacent faces of the cam discs 67 whereby the cross head 72 and depending tubular stem 70 are supported and adapted to be reciprocated vertically on rotation of the shaft 55 and cam discs 67 in timed relation to the movement of the cylinder L; the cam groove 76 being formed to permit downward movement of the tubular stem at the commencement of its downstroke in unison with downward movement of the cylinder L, and to retard downward movement of the cylinder approaching the termination of the downstroke thereof, and to permit upward movement of the cylinder relative to the tubular stem at the commencement of their upstroke with simultaneous movement when in their normal relative positions approaching the termination of their upstroke.

Depending from the cross head 72 is a pair of guide pins 77 which slidably engage openings 78 formed in the wall 62, whereby the cross head and the tubular stem are held against turning relative to the cylinder L and the roller 75 maintained in proper alignment with the cam groove 76.

Mounted on the lower end of the tubular stem 70 is a block 80 constituting a support in part for the capping units B whereby the latter are carried vertically with the tubular stem 70 by the action of the cam grooves 76.

Extending transversely of the cross head 72 is a cross head 81 to the outer ends of which is affixed a pair of depending stems 82 projecting through guideways 83 carried by the wall 62 which stems project downwardly into the cylinder L and are connected at their lower ends to a ring 84 encircling the tubular stem 70 in spaced relation thereto and disposed on a plane above the block 80. The cross head 81 is fitted with a vertically extending roller 85 which engages a cam groove 86 in a cam disc 87 carried on the shaft 55 whereby the stems 82 and ring 84 are adapted to be reciprocated vertically and to have movement relative to that of the cylinder L and tubular stem 70 on rotation of the shaft 55.

Extending longitudinally through the tubular stem 70 is a reciprocal stem 90 which projects below the block 80 and connects through a ball and socket connection 91 with a circular cap engaging shoe 92 adapted to be seated on the central portion of the cap blank D to hold the latter in its seated position on the upper margin of the bottle rim E during the cap applying operation. The upper end of the stem 90 connects with a strap 93 of general rectangular form which encompasses the shaft 55 in spaced relation thereto; the shaft being fitted with a cam 94 projecting into the space bounded by the strap 93 and intermittently engageable with a shoulder 95 formed on the inner upper margin thereof to effect upward movement of the strap and stem 90 with the shoe 92 on each revolution of the shaft 55.

A spring 96 interposed between the upper end of the strap 93 and a fixed bracket 97 carried by the standard 52 acts to effect downward movement of the strap, stem and shoe when the cam 94 disengages the shoulder 95.

A spring 98 wound around the stem 70 bears between the wall 62 and a collar 99 seating on a spacer 100 carried on the block 80 and exerts a downward thrust on the stem 70 and yieldably opposes upward movement thereof relative to the cylinder L.

Figure 15:
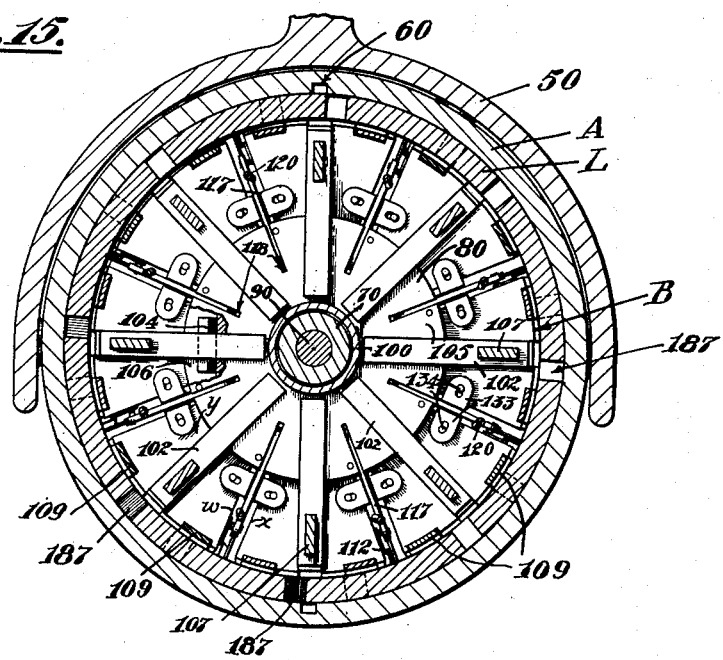
Fig. 15 is a view in horizontal section and plan taken on the line 15—15 of Fig. 11.
Figure 16:
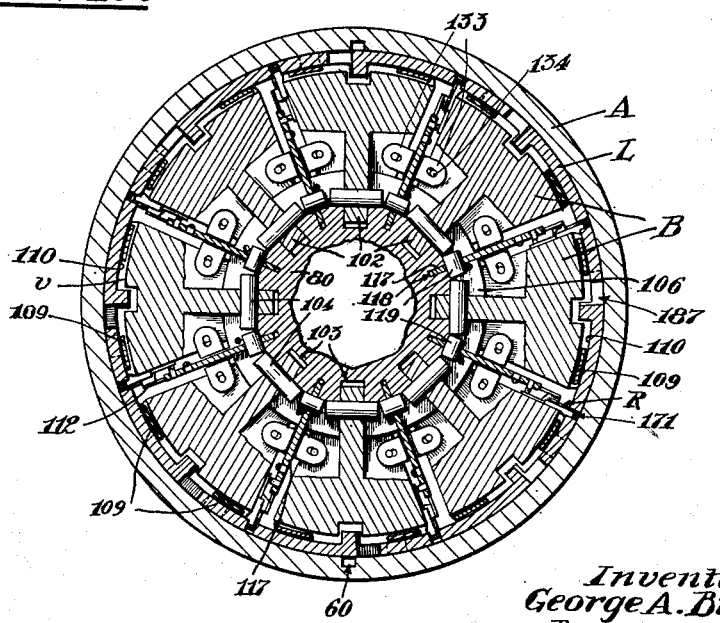
Fig. 16 is a view in horizontal section partly in plan as seen on the line 16—16 of Fig. 11.

The unit carrying block 80 is formed at its upper margin of circular outline as shown in Figs. 15 and 16, and at its lower margin of octagonal outline as shown in Fig. 17, and projecting from each of the octagonal faces thereof is one of the units B each of which is pivotally supported on the block 80 to swing vertically relative thereto, as will presently be described.

Each of the units B embodies a body portion 101 of general segmental shape in outline, that is, with an arcuate outer face v, side faces w and x extending parallel with radial planes leading from the axis of the block 80, and each unit B being formed with substantially flat upper and lower faces y and z, respectively. Projecting upwardly from the top face y of the body 101 and protruding inwardly from the inner margin thereof is a flange 102 which extends at its inner margin into radial slots 103 formed in the hexagonal side faces of the block 80 and extending vertically intermediate the intersections of adjacent side faces, and projecting through the flange 102 is a pivot pin 104 the ends of which protrude laterally from opposite sides of the flange and are engaged between horizontally projecting marginal flanges 105 and 106 on the block 80 as particularly shown in Fig. 30, thus forming a pivotal support on which the capping unit may swing vertically.

Projecting upwardly from the forward portion of the flange 102, as particularly shown in Figs. 18, 19 and 20, is a lug 107 to which is connected one end of a coil spring 108 which leads upwardly and inwardly at an incline and is connected at its opposite end to the collar 99 as shown in Fig. 30, which spring is tensioned to exert an inward and upward pull on the outer, upper marginal portion of the unit tending to rock the latter upwardly on the pivot pin 104. This upward swinging movement of the unit is limited by reason of its outer arcuate face v extending in close proximity to the inner periphery of the cylinder L and abutting against the lower end portion of a plate spring 109 which seats upon a beveled face 110 on the inner lower margin of the cylinder L and which plate spring extends longitudinally of the cylinder and has its intermediate portion bowed inwardly away from the inner periphery of the cylinder and has its upper end affixed to the cylinder as by a screw 111. The spring 109 is tensioned to bear inwardly on the outer face v of the unit B so as to maintain the latter with the pivot pins 104 seated in the channel formed between the flanges 105 and 106.

The adjacent units B are spaced apart as particularly shown in Figs. 17 and 31, and are arranged so that their adjacent faces will extend equi-distant on opposite sides of a vertical plane extending along the radial fold lines c of a cap blank D positioned on a bottle in axial alignment with the shoe 92 and stem 90.

Mounted on the side face w of the unit B as particularly shown in Fig. 18, is a dependent bell-crank finger 112 mounted on a pivot pin 113 arranged to swing on a plane midway between adjacent units and disposed to normally extend above one of the V-notches a on the margin of the cap blank D; the finger 112 having a tapered bill 114 adapted to be engaged with the underside of the blank D at the outer end of the radial fold line c, as particularly shown in Fig. 32.

Pivotally connecting with the other arm 115 of the bell crank finger is an upwardly extending link 116 which connects with the outer end of an arm 117 which extends into a vertical radial slot 118 formed in the block 80 and is pivoted to swing vertically on a pivot pin 119 seating between the flanges 105 and 106 on the block.

Connecting with the outer end portion of the arm 117 is an upwardly extending rod 120 which leads through an opening 121 in the marginal portion of the ring 84 and has a collar 122 abutting against the underside of the ring. A spiral spring 123 is wound around the upper portion of the rod 120 and bears between the upper face of the ring 84 and a collar 124 carried on the upper end of the rod. It will now be seen that relative vertical movement of the block 80 and ring 84 will effect rocking of the arm 117 through the bar 120 and at the same time effect swinging movement of the bell crank finger 112 through the link 116.

Mounted on each of the units B and extending over the opposite sides thereof is a pair of breaker plates 130 and 131 the inner margins of which protrude beyond the inner marginal face of the unit bodies 101 and having a marginal contour arranged to conform and register with the fold lines f—d and g—e, respectively, when the cap has been folded to form the pleat K.

The plates 130 and 131 are yieldably supported for movement toward and away from the side faces w and x of the unit bodies 101, and for this purpose are formed with inturned upper end flanges 132 as particularly shown in Fig. 21, which overlie the top face y of the unit and are formed with slots 133 extending longitudinally at right angles to the faces w and x which are engaged by pins 134 projecting upwardly from the upper face y of the unit body. The plates 130 and 131 are also formed with flanges 135 on their lower ends which underlie the lower face z of the unit body and are engaged by pins 136 on the latter.

Mounted in recesses 137 in the side walls w and x of the unit body are coil springs 138 which bear outwardly against the inner faces of the breaker plates 130 and 131 and normally maintain the latter in an outermost position. An inwardly extending and downturned flange 140 is formed on the upper inner marginal portion of each breaker plate 130 and 131, the downturned end of which extends into a slot 141 formed in the unit body to cooperate with the pin 134 and slot 133 to limit outward movement of the breaker plates and also limit the pivotal movement of the plates around the axis of the pins 134 and 136.

The unit body 101 is formed in two pieces a' and b' as particularly shown in Fig. 26 which are detachably connected together by screws 145, and between which pieces is formed a chamber 146 in which is mounted the tongue bending and threading mechanism which as here shown embodies a register arm N, a folding arm O and a reciprocal needle P, as shown in Fig. 23. The register arm N comprises one end of a bell crank lever 150 pivoted to swing horizontally on a pivot pin 151 and including a finger 152 at its extremity adapted to be engaged with one of the openings m in the cap blank D. The other arm of the bell crank 150 is formed with an upturned end portion 153 which is engaged by an advancing spring 154 having an intermediate coiled portion wrapped around a pin 155 one end of which spring bears against the upstanding end 153 of the bell crank 150 and tends to normally rock the bell crank lever 150 to swing the finger 152 outwardly relative to the inner face of the unit body. The other end of the spring 154 bears against a pin 156 carried by a lever Q for actuating the needle P as will be later described; the spring 154 serving to maintain the lever Q and needle P in a retracted position.

The tongue bending arm O is mounted for both longitudinal and oscillatory movement and for this purpose is formed with an elongated slot 157 on its inner end portion which engages a pivot pin 158 carried by the unit body, and connecting with the outer end of the arm is a spring 159 engaged with the pin 155 and which spring is tensioned to exert a pull on the outer end of the arm O tending to advance the inner end thereof towards the breaker plate 130. As a means for aiding in holding the arm O in a retracted position the breaker plate 130 is formed with a rearwardly extending lip 160 which projects into the space 146 within the unit body and forming an inclined abutment against the outer end of which a marginal lug 161 on the arm O normally seats. Projecting from the edge of the arm O opposite the lug 161 is a lug 162 which engages the upstanding projection 153 on the bell crank 150 and serves to hold the latter in retracted position when the arm O is in its retracted position.

The outer end of the arm O terminates in a laterally condensed finger 163 which when the arm is disposed in its normal retracted position extends contiguous the inner face of the unit body approximately at right angles to the finger 152 on the register arm N and is disposed to be presented laterally to the tongue N of the blank on initial advance of the arm O longitudinally. The arm N is formed at the intersection of the finger 152 thereof and the arm portion.

The arm O is primarily retained in its retracted position by a trip catch R which embodies an arm 165 particularly shown in Fig. 26, which catch is pivoted to swing vertically on a pivot pin 166, as shown in Fig. 23, and is normally maintained in engagement with an upstanding shoulder 167 on the outer end of the arm O under the urge of a spring 168 carried in a socket 169 in the upper member $a'$ of the unit body.

The outer end of the arm 165 projects beyond the outer arcuate face of the unit body and terminates in a finger 170 adapted to be engaged by the lower end of a depending leaf spring 171 carried on the cylinder L and projecting below the lower margin of the latter, on downward movement of the cylinder relative to the capping units at a predetermined time to effect release of the elements O and N and permit the advance thereof under the urge of the springs 154 and 159; the spring 154 acting through the upstanding projection 153 on the lever 162 to advance the arm O longitudinally to unseat the lug 161 from the end of the inclined abutment 160, and then allow the spring 159 to swing the tongue folding arm O.

The needle P embodies a slide block 175 formed with oppositely extending flanges 176 on its upper and lower inner margins, which flanges are slidably engaged in guide grooves 177 formed in the opposed walls of the space 146 between the members $a'$ and $b'$ of the unit body whereby the slide block 175 is guided for longitudinal reciprocal movement; the needle being thus mounted to move in a path of travel extending at right angles to the side face $w$ of the unit body. Formed on the slide block 175 and projecting from the forward end thereof in alignment with the guide flanges 176 is the needle proper which embodies a flat shank 178 having a pointed outer end portion 179 constituting a punch or perforator and which shank is formed with a longitudinally extending slot 180 of rectangular outline which slot extends throughout the length of the slide block 175 and terminates at the base of the needle point 179 in a straight wall 181. The slide block 175 is formed with parallel side walls $c'$ and $d'$ as particularly shown in Fig. 28, which are formed with marginal sockets 182 engaged by the inner end of a yoke 183 embodied in the lever Q which latter is mounted to swing horizontally on a pivot pin 184.

The outer end of the lever Q terminates in a knob 185 which projects beyond the outer arcuate periphery of the unit body through an elongated opening 186 leading to the space 146; the knob 185 being normally disposed adjacent one end of the slot under the urge of the spring 154 in which position it is aligned with the lower open end of a circumferentially inclined slot 187 formed in the lower margin of the cylinder L. The slot 187 extends diagonal to the vertical path of travel of the cylinder L and is adapted on downward movement of the latter to be positioned astride the knob 185 and to effect lateral movement of the latter, and thereby swing the lever Q so as to advance the needle P.

The breaker plate 130 is formed with a slot 188 in alignment with the shank 178 of the needle P through which the pointed end 179 of the needle and the elongated shank thereof are projected when the needle is advanced.

In the operation of the invention, the bottle cap blank D is positioned over the mouth of a bottle F and seated on the bottle rim E, as shown in Fig. 11, with the center of the cap D disposed in alignment with the axis of the bottle which in turn is positioned beneath the capping mechanism in axial alignment with the stem 90 and cylinder L; the cap blank being disposed with its marginal portion projecting beyond the rim of the bottle, and with the V-notches $a$ disposed beneath the fingers 114 on the bell crank arm 112 and with the radial score lines $c$ of the blank disposed on a vertical plane extending midway between the capping units B.

On rotation of the shaft 55, the cams 67, 87 and 94 are revolved therewith, the action of which, assuming the parts to be disposed in the normal position shown in Fig. 11, will be as follows:

The direction of rotation of the shaft 55 being clockwise as viewed in Fig. 30, to which reference is now had, a slight turning movement of the shaft 55 will move the cam 94 to the right from beneath the shoulder 95 thereby allowing the strap 93, stem 90, and shoe 92 to move downwardly under the urge of the spring 96 so as to bring the shoe into engagement with the cap blank D and clamp the latter in place on the upper margin of the bottle rim under the pressure imposed by spring 96, thus securely holding the cap blank against movement. During this movement the cam grooves 66 will act through the rollers 65 and hangers 64 to rapidly lower the cylinder L a short distance as from the position shown in Fig. 30 to that shown in Fig. 32, and at the same time the cam groove 76 will advance to permit lowering of the stem 70 and block 80 in unison with the cylinder L so as to position the fingers 114 on the bell crank arms 112 on a plane below the underside of the cap blank D; the fingers 114 passing through the notches $a$ in the margin of the blank. At this point, a contour $e'$ in the cam groove 86 acts to hold the cross head 81, stems 82 and ring 84 against downward movement relative to the cylinder L and block 80 as particularly shown in Fig. 32, thereby causing an upward pull to be exerted on the rods 120 which act through the arms 117 and links 116 to rock the bell crank arms 112 and position the fingers 114 into engagement with the margin of the blank D at the ends of the radial score lines $c$. In the meantime, the lower ends of the breaker plates 130 and 131 will be brought into contact with the upper surface of the blank D adjacent the fold lines $f$—$d$ and $g$—$e$, thereby moving the areas $i$—$j$ of the blank downwardly relative to the plane of the radial fold lines thus starting the formation of the pleats K. The parts will then be positioned as shown in Figs. 32 and 33.

Figure 34:
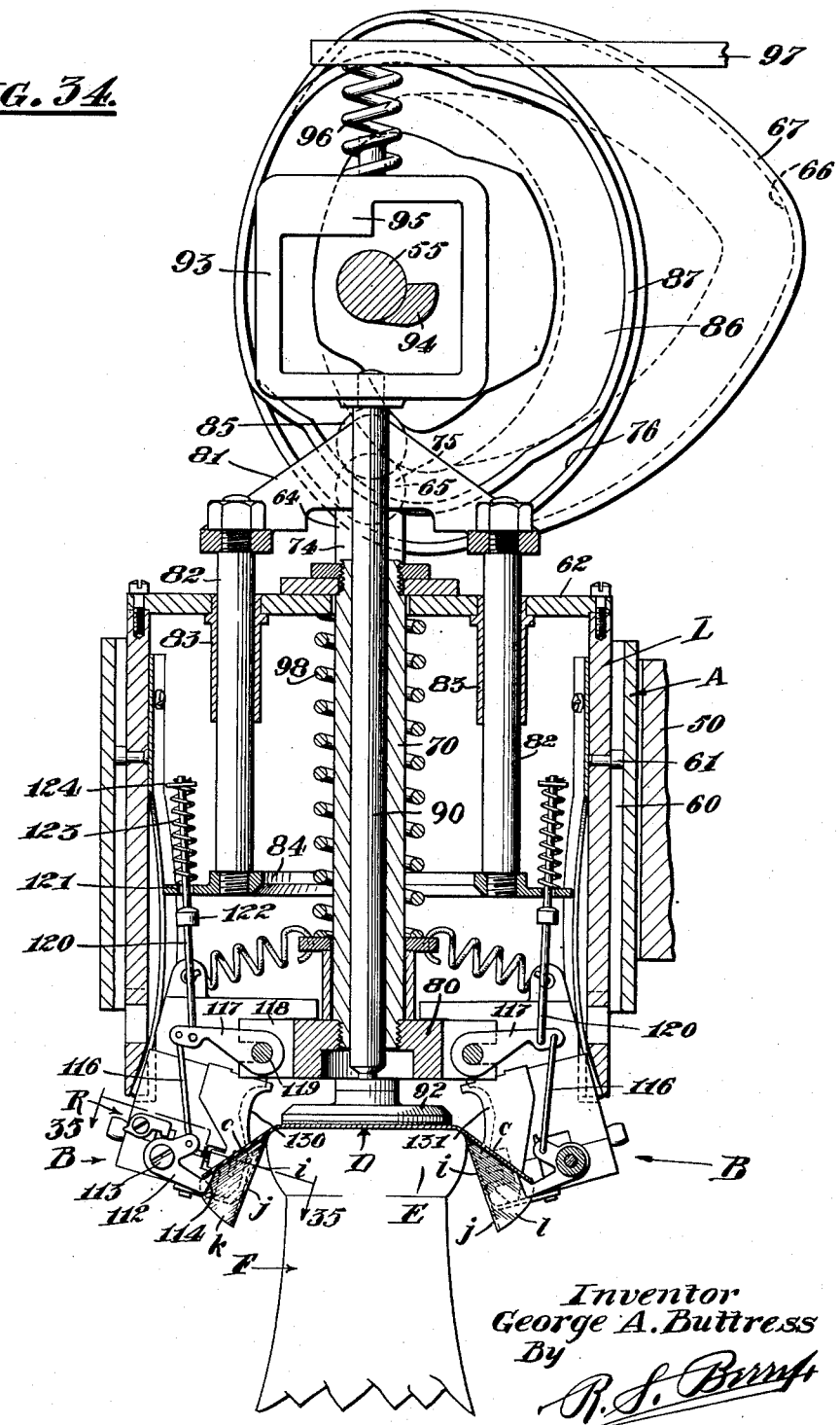
Fig. 34 is a view in section and elevation similar to Fig. 32, showing the parts as positioned in effecting initial folding of the pleats on the margin of the bottle cap.
Figure 35:
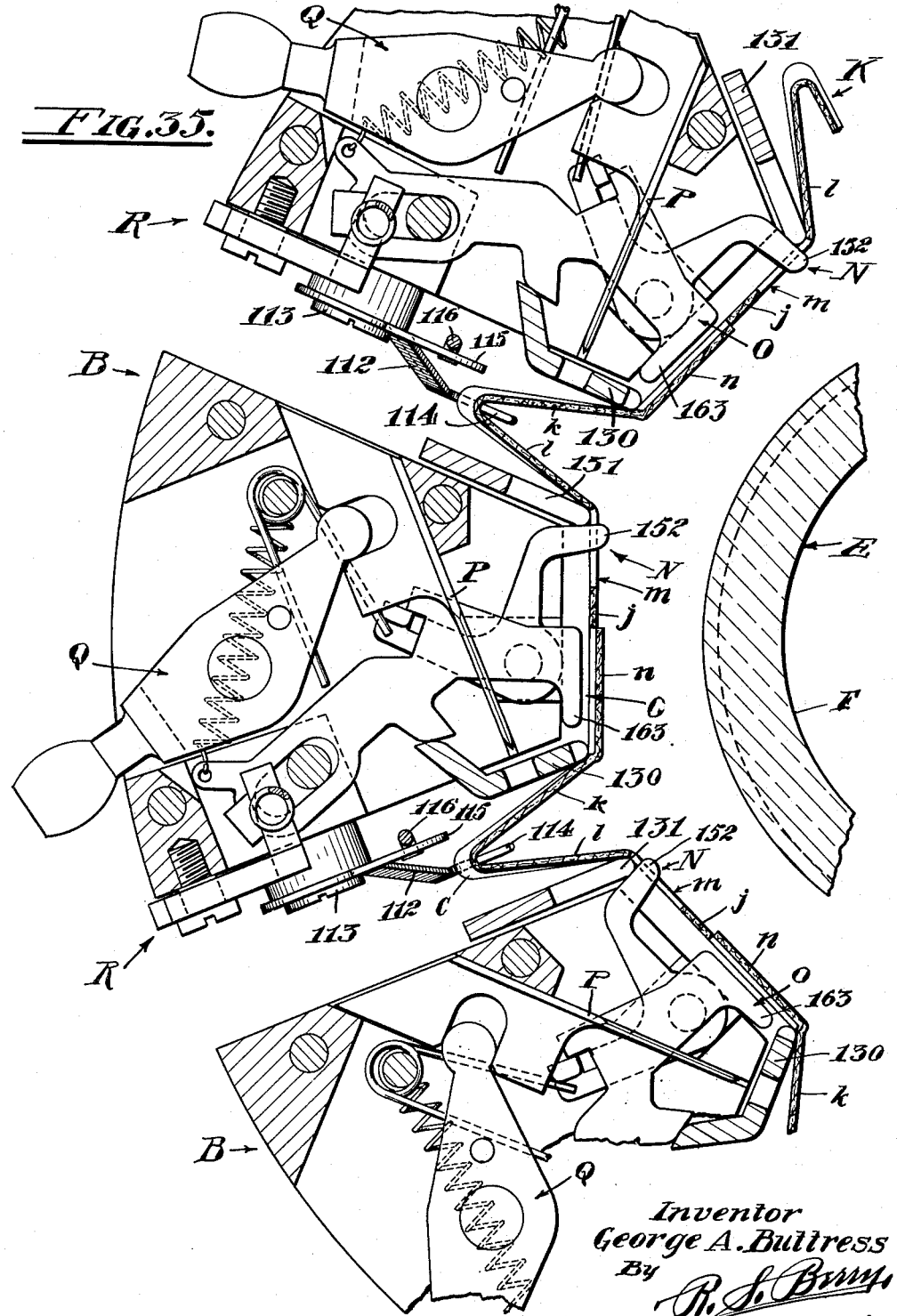
Fig. 35 is a view in horizontal section and plan as seen approximately on the line 35—35 of Fig. 34, showing a fragmentary portion of the capping mechanism with the parts disposed in effecting initial formation of the pleats.

At approximately one-fourth of the revolution of the shaft 55 the cam grooves 66 and 76 will effect continued lowering of the cylinder L and block 80 to the position shown in Fig. 34, thus lowering the units B relative to the normal plane of the cap blank D, and thus bending the marginal portion of the latter downwardly along the upper margin of the bottle rim E. At the same time the cam 86 acts to further retard movement of the ring 84 relative to the block 80 so as to cause the bell crank fingers 112 to further lift the ridge portions of the pleats K relative to the base portions thereof, and accordingly act to bring the side portions of the pleats closer together as particularly shown in Fig. 35.

Figure 36:
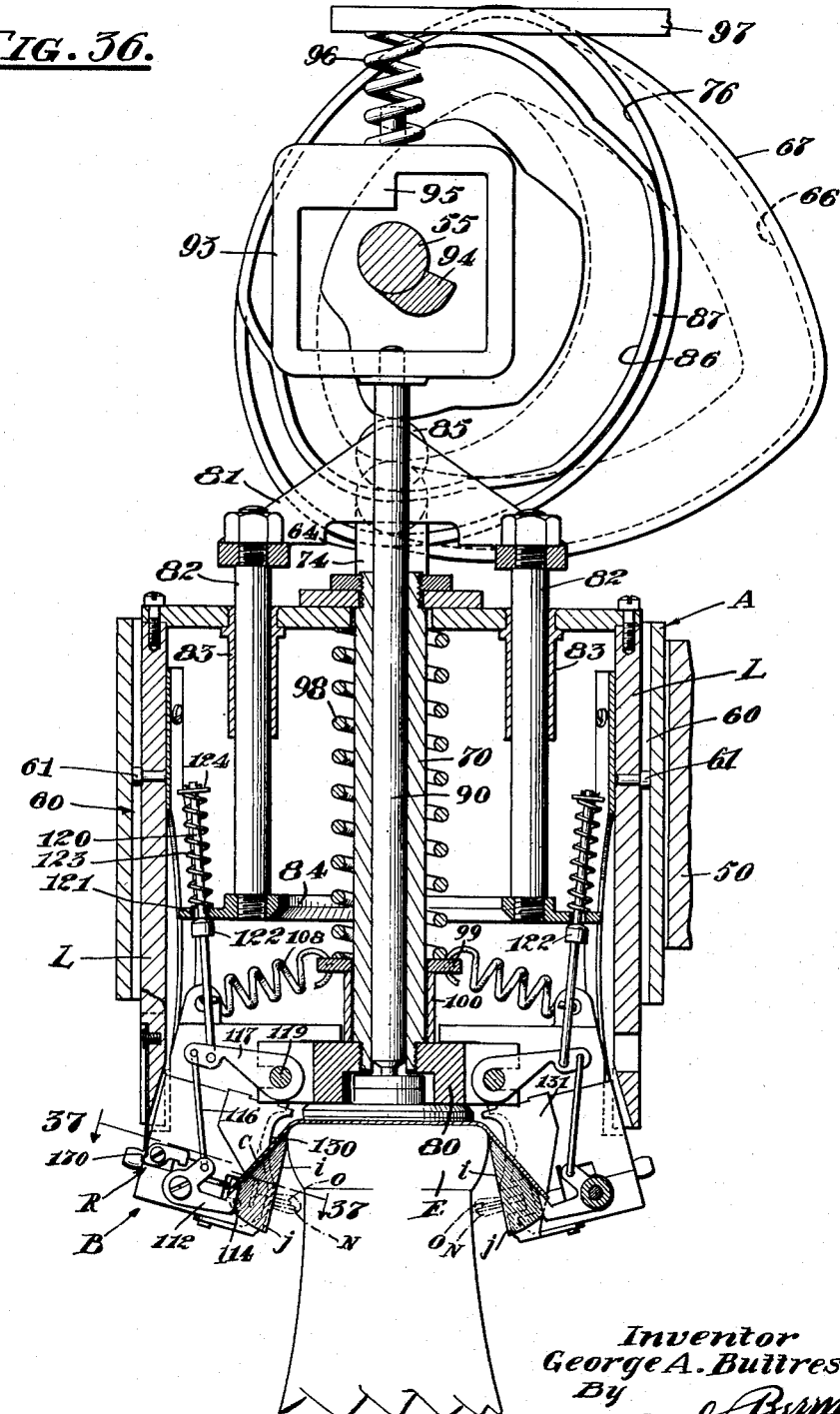
Fig. 36 is a view in section and elevation similar to Fig. 34, showing the capping mechanism with the parts arranged in effecting bending of the tongues in a reversed direction and in readiness for introducing the tongues through perforations in the cap blank.

At this point the units B will be rocked inwardly and the then downwardly extending margin of the blank D brought into such relation to the forward or inner faces of the units that the fingers 152 of the arms N will be projected into the openings m in the blank, and at the same time the tongues n of the blank will be positioned opposite the inner ends of the tongue bending arms O. A slight continued rotation of the shaft 55 causes the cams 76 to bring the block 80 into its lowermost position seated on the shoe 92, as shown in Fig. 36. At the same time the cams 66 will effect a substantially corresponding downward movement of the cylinder L, thus bringing the downwardly projecting plate springs 171 in close proximity to the fingers 170 of the trip catches R, as shown in Fig. 36, whereupon a slight continued downward movement of the cylinder L under action of the cams 66 will cause the springs 171 to rock the catches R so as to release the arms N and O.

Figure 37:
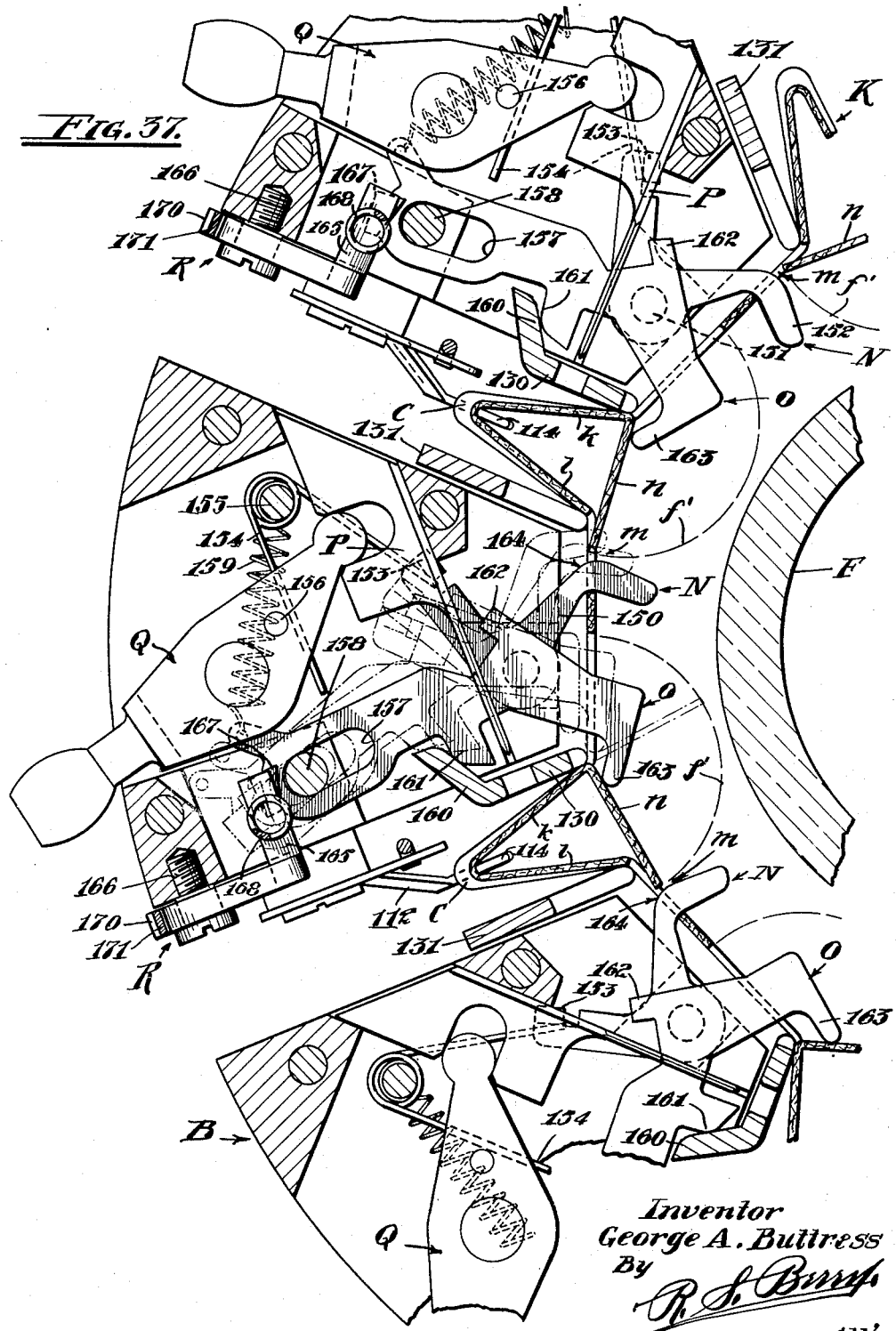
Fig. 37 is a view in section and plan as seen on the line 37—37 of Fig. 36.

The springs 154 and 159 then act to advance the outer ends of the arms N and O and cause the fingers 152 on the arms N to project through the openings m in the cap blank as shown in Fig. 37, and at the same time causing the fingers 163 on the arms O to press the tongues n inwardly from the blank and to turn them rearwardly along the path indicated by the dotted lines f' in Fig. 37 to position the tips of the tongues n adjacent the rounded shoulders 164 of the arms N. The end portions of the arms N and O will then project through the downturned marginal portion of the cap blank D which at this point is spaced a short distance from the outer periphery of the neck of the bottle to accommodate the protruding ends of the arms as indicated in dotted lines in Fig. 36.

Figure 38:
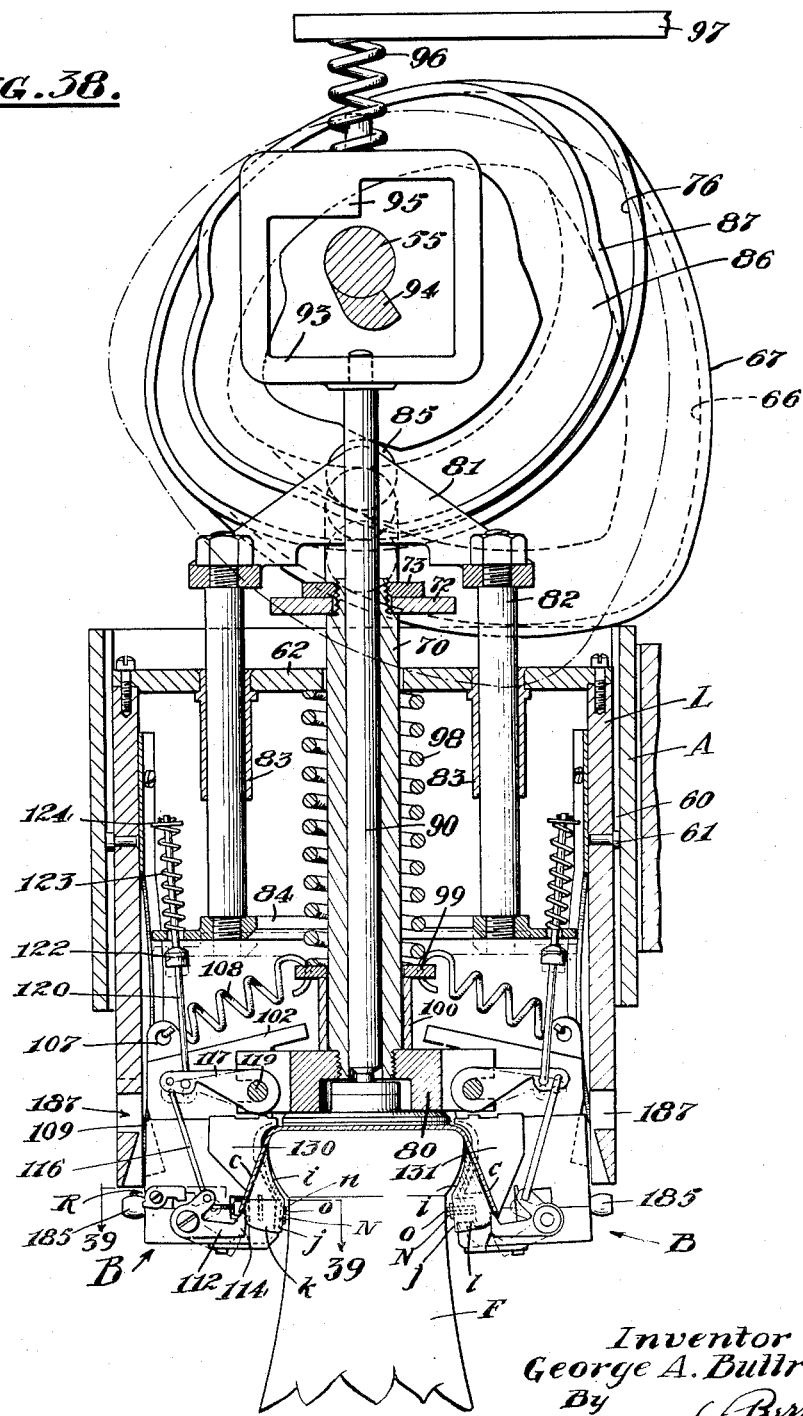
Fig. 38 is a view in section and elevation similar to that shown in Fig. 36, depicting the parts as positioned on folding the sides of the pleats together and at the same time effecting leading of the tongues through the slots in the blank.
Figure 39:
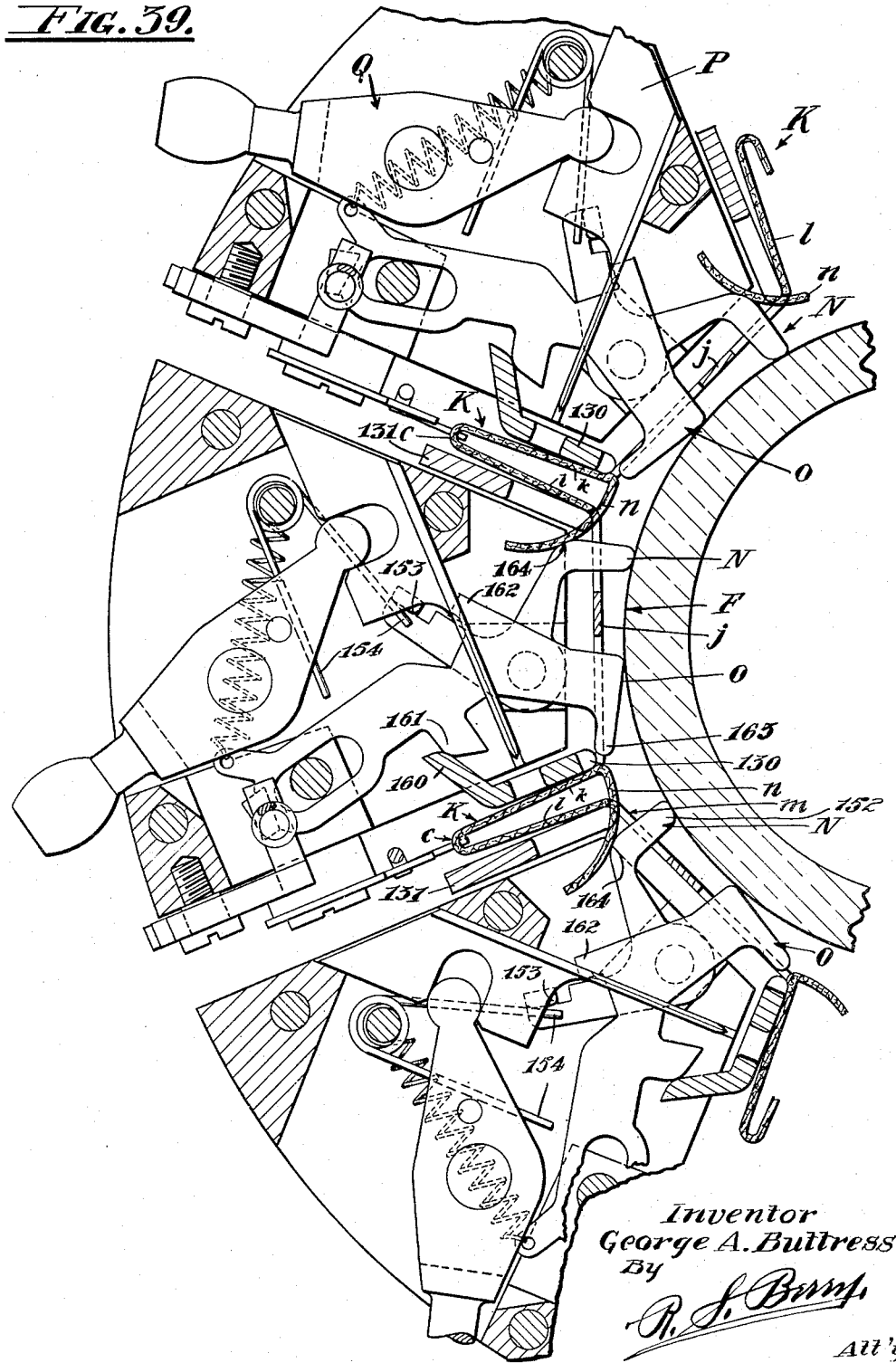
Fig. 39 is a horizontal section and plan view taken on the line 39—39 of Fig. 38, showing the parts as disposed with the pleats in their nearly completed folded position.

The cams 66 will then act to effect continued lowering of the cylinder L as shown in Fig. 38, thus causing the cylinder to advance along the outer arcuate faces of the units B thereby rocking the latter inwardly so as to bring the ends of the arms N and O against the outer periphery of the neck of the bottle F and thereby continued advance of the units toward the bottle neck will effect retractive movement of the arms N and O as shown in Fig. 39; the retractive movement of the arms N, which then extend along the back of the then rearwardly extending tongues n to bend the tongues outwardly. The arms O on being retracted cause the lugs 161 to ride upwardly on the inclined abutments 160 thereby retracting the fingers 163 out of engagement with the tongues n.

A slightly continued downward movement of the cylinder L then brings the inner margins of the units B close to the outer periphery of the bottle neck as shown in Fig. 40, which effects retraction of the arms N and O to a point slightly beyond their normal positions, and which permits the catches R to move in front of the projections 167 on the arms O under the urge of the springs 168 in readiness to effect holding the arms N and O in their normal retracted positions.

During this latter movement of the cylinder L the marginal portion of the cap blank is brought into close contact with the circumferential surface of the bottle neck and at the same time the breaker plates 130 and 131 on adjacent units B will be brought close together by reason of the inward advance of the units B so as to compress the side walls k and l of the pleats K tightly together. The tongues n will then be acted on by the longitudinal outer edges of the fingers 152 so as to be drawn taut across the inner margins of the side walls of the pleats K with tongues projecting at an acute angle and slightly on a curvature from the base of the pleat.

During this slight continued movement of the cylinder L the knobs 185 on the outer ends of the lever Q will be caused to enter the lower ends of the inclined slots 187 on the cylinder L. Just preceding this latter downward movement of the cylinder L, the cam groove 86, by reason of a contour e' will act through the roller 85, cross head 81, and stems 82, to depress the rings 84 against the collars 122 on the rods 120 so as to depress the latter and rock the arms 117 downwardly, thus acting through the links 116 to swing the bell crank fingers 112 downwardly and thus free the fingers 114 from the pleats.

On completion of one half a revolution of the shaft 55 the cam grooves 66 will effect further downward movement of the cylinder L from the position just described to that shown in Fig. 41, whereby the knobs 185 were caused to traverse the diagonal slots 187, thereby swinging the levers Q so as to advance the needles P and cause the outer pointed ends thereof to penetrate the side walls of the pleats K thereby puncturing the latter; the needles P being advanced by this action such distance that the tips thereof will ride over the tongues n until the outer end portions of the tongues are caused to spring into the slots 180 of the needle shanks 178 and be engaged by the end walls 181 of such slots, as particularly shown in Fig. 42.

The cylinder L will then be disposed in its lowermost position shown in Fig. 41; the shoe 92 will bear tightly against the portion of the cap seating on the top of the bottle rim, while the inner edges of the breaker plates 130 and 131 will have positioned the marginal portion of the cap blank in close conformity to the contours of the bottle rim and the contiguous portions of the bottle neck.

Continued rotation of the shaft 55 acts through the cam grooves 66, 76 and 86 and through the stem 94 to effect reverse movement of the parts substantially in the reverse sequence or order to that effected on the first half revolution of the shaft and the cam.

On initial upward movement of the cylinder L, the levers Q are retracted to their normal position and in so doing effect retraction of the needles P so as to draw the tongues n through the slits formed in the pleats K, as particularly shown in Fig. 43. In thus threading the end portions of the tongue through the slits, their widened portions are slightly buckled or crimped since the slits thus formed are narrower than the width of the tongues. The ends of the tongues will then protrude in the slots 188 in the breaker plates 130.

On continued upward movement of the cylinder L, as to the position shown in Fig. 44, the units B will be swung outwardly under the urge of the springs 108 thus causing the breaker plates 130 to slide outwardly along the pleats K and thereby cause the tips of the tongues n to be folded to overlie the pleats K in close proximity thereto which effects clinching of the tongues and which in conjunction with the enlarged outer end portions thereof overlying the end margins of the slits securely fastens the tongues against accidental withdrawal and tightly fastens the side walls of the pleats K together and whereby the collective pleats K with the fastening tongues secure the completed cap tightly in place on the bottle.

During this slightly retractive movement of the units the arms N and O advance slightly to their normal position.

Continued rotation of the shaft 55 causes the cam 94 to engage the shoulder 95 on the strap 93 so as to lift the latter together with the stem 90 and thereby elevate the shoe 92 out of engagement with the cap as shown in Fig. 46. At this point the cams 66, 76 and 86 operate collectively and in unison to elevate the cylinder L, block 80 and ring 84 as a unit to their normal position shown in Fig. 11, whereupon the parts are disposed in readiness for another operation.

The invention is also applicable for use in effecting application of bottle cap blanks of the type in which the caps are initially dished or bent along their several fold lines, as is initially effected by the present machine in operating on a flat blank, but in which event the cam 86 with the mechanism controlled thereby, including the ring 84 and bell crank fingers 112 and their various connections will then be dispensed with, since in this instance no initial breaking of the fold lines will be necessary.

Manifestly other changes may be made in the parts and in their construction and arrangement as occasion may require, and accordingly the invention contemplates the employment of such modification of the parts and arrangements thereof as come within the meaning and scope of the appended claims.

I claim:

1. In a machine for forming and applying paper caps on bottles, means for holding a cap blank on the rim of a bottle, means for bending the marginal portion of the blank to encompass the rim of a bottle with a plurality of radially extending pleats on the blank, and means for threading tongues struck from said blank through the side walls of said pleats.

2. In a machine for forming and applying sheet cap blanks to bottles, means for bending marginal portions of the cap blank downwardly around the rim of a bottle with a series of radially extending pleats on said downwardly extending portion, means for perforating the walls of said pleats, and means for threading tongues on said blanks through said perforations.

3. In a machine for forming and applying sheet cap blanks to bottles, means for bending marginal portions of the cap blank downwardly around the rim of a bottle with a series of radially extending pleats on said downwardly extending portion, means for perforating the walls of said pleats, means for threading tongues on said blanks through said perforations, and means for clinching the end portions of the tongues on said pleats.

4. In a machine for capping bottles, means for bending the marginal portion of a cap blank downwardly around the rim of a bottle and folding the downwardly extending portion of the blank to form a series of pleats, means for folding tongues formed in said blank to extend across the base portion of the side walls of said pleats, and means for returning said tongues through said pleats.

5. In a bottle capping machine, means for holding a bottle cap blank on the rim of a bottle, means for engaging the edge of the blank at spaced intervals throughout the periphery thereof, means for depressing the marginal portion of the blank between the edge engaging means to form pleats and for conforming the marginal portion of the blank between the formed pleats to the rim of the bottle.

6. In a bottle capping machine, means for holding a bottle cap blank on the rim of a bottle, means for engaging the edge of the blank at spaced intervals throughout the periphery thereof, means for depressing the marginal portion of the blank between the edge engaging means to form pleats and for conforming the marginal portion of the blank between the formed pleats to the rim of the bottle, and means for passing a portion of the blank through overlying walls of said pleats.

7. In a bottle capping machine, means for holding a bottle cap blank on the rim of a bottle, means for engaging the edge of the blank at spaced intervals throughout the periphery thereof, means for depressing the marginal portion of the blank between the edge engaging means to form pleats and for conforming the marginal portion of the blank between the formed pleats to the rim of the bottle, means for forming slits through overlying walls of said pleats embodying means for passing tongues formed on said blank through the slits.

8. In a bottle capping machine, means for holding a bottle cap blank on the rim of a bottle, means for engaging the edge of the blank at spaced intervals throughout the periphery thereof, means for depressing the marginal portion of the blank between the edge engaging means to form pleats and for conforming the marginal portion of the blank between the formed pleats to the rim of the bottle, means for forming slits in overlying walls of said pleats, means for bending tongues formed in the blank to extend across the base portions of said walls and extending the end portions of said tongues alongside said walls, and means for passing the end portions of said tongues through said slits.

9. In a bottle capping machine, means for holding a bottle cap blank on the rim of a bottle, means for engaging the edge of the blank at spaced intervals throughout the periphery thereof, means for depressing the marginal portion of the blank between the engaging means to form pleats and for conforming the marginal portion of the blank between the formed pleats and the rim of the bottle, means for forming slits in overlying walls of said pleats, means for bending tongues formed in the blank to extend across the base portions of said walls and extending the end portions of said tongues alongside said walls, means for passing the end portions of said tongues through said slits, and means for clinching the ends of said tongues against said pleats.

10. In a bottle capping machine, a vertically reciprocal cylinder, a series of cap forming units arranged interiorly of said cylinder adapted to be positioned around the rim of a bottle, means encircled by said series of units for clamping a bottle cap blank on the rim of a bottle, means for raising and lowering said cylinder, units and cap blank clamping means independent of each other, means whereby downward movement of said cylinder relative to said units will advance said units collectively to effect bending of the marginal portion of the blank downwardly around the rim of the bottle, means carried by said units for effecting folding of the marginal portion of the blank into radially extending pleats, means carried by said units for punching slits through the overlying side walls of said pleats, and means embodied in said punching means for threading portions of the blank through said slits.

11. In a bottle capping machine, a vertically reciprocal shoe for clamping a bottle cap blank on a bottle rim, a series of pivotally supported cap forming units, means for raising and lowering said units and said shoe relatively to each other, means on said units for bending the marginal portion of the blank downwardly around the rim of the bottle, means associated with said units for forming radially extending pleats on the downturned marginal portion of the blank, and means for effecting swinging of said units collectively in and out of engagement with the cap blank.

12. In a bottle capping machine, a vertically reciprocal shoe for clamping a bottle cap blank on a bottle rim, a series of pivotally supported cap forming units, means for raising and lowering said units and said shoe relatively to each other, means on said units for engaging the under side of the edge of said blank at spaced intervals throughout the margin thereof, means on said units for bending the marginal portion of the blank downwardly around the rim of the bottle, means associated with said units cooperating with said engaging means for forming radially extending pleats on the downturned marginal portion of the blank, and means for effecting swinging of said units collectively in and out of engagement with the cap blank.

13. In a bottle capping machine, a series of cap forming and applying units adapted to conform the marginal portion of a cap blank to a bottle rim, means associated with said units for forming radial pleats on said marginal portion, a punching needle carried by each of said units, means for actuating said needles to form slits in the overlying walls of said pleats, means for bending tongues on said blank into position for engagement by said needles, and means embodied in said needles for engaging said tongues, and threading the tongues through said slits.

14. In a bottle capping machine, a series of units for conforming the marginal portion of a cap blank to a bottle rim, means associated with said units for forming pleats on said marginal portion, a plurality of arms on each of said units, means on said arms for bending tongues on said blanks to extend across the inner margins of the side walls of said pleats and to project the outer end portions of said tongues outwardly along said pleats, means for actuating said arms to effect bending of said tongues, and means for threading said tongues through the overlying walls of said pleats.

15. In a bottle capping machine, a series of units for conforming the marginal portion of a cap blank to a bottle rim, means associated with said units for forming pleats on said marginal portion, a plurality of arms on each of said units, means on said arms for bending tongues on said blanks to extend across the inner margins of the side walls of said pleats and to project the outer end portions of said tongues outwardly along said pleats, means for actuating said arms to effect bending of said tongues, a reciprocal needle carried by each of said units, means for advancing said needles to perforate said pleats, and means embodied in said needle for threading said tongues through said pleats.

16. In a bottle capping machine, a series of units for conforming the marginal portion of a bottle cap blank to a bottle rim, means on said units for engaging the underside of the edge of the blank at spaced intervals throughout the periphery thereof, means associated with said units cooperating with said last named means for bending said marginal portion to form a plurality of radial extending pleats thereon, and means embodied in adjacent of said units for threading portions of said blanks through the overlying side walls of said pleats.

17. In a bottle capping machine, a series of pivotally supported units for conforming the margin of a cap blank to the rim of a bottle, means for raising and lowering the unit assembly, a vertically reciprocal cylinder encircling said units and cooperable therewith to effect inward swinging movement of said units on the downstroke of said cylinder, breaker plates on adjacent units for folding pleats on the marginal portion of said blank on inward movement of said units, and means carried by said units for threading portions of said blanks through the overlying side walls of said pleats.

18. In a bottle capping machine, a series of pivotally supported units for conforming the margin of a cap blank to the rim of a bottle, means for raising and lowering the unit assembly, a vertically reciprocal cylinder encircling said units and cooperable therewith to effect inward swinging movement of said units on the downstroke of said cylinder, breaker plates on adjacent units for folding pleats on the marginal portion of said blank on inward movement of said units, a reciprocal punching needle on each of said units for perforating the overlying side walls of said pleats, means on said cylinder for actuating said needles, and means embodied in said needles for threading portions of said blanks through said pleats.

19. In a bottle capping machine, a series of pivotally supported units for conforming the margin of a cap blank to the rim of a bottle, means for raising and lowering the unit assembly, a vertically reciprocal cylinder encircling said units and cooperatable therewith to effect inward swinging movement of said units on the down stroke of said cylinder, breaker plates on adjacent units for folding pleats on the marginal portion of said blank on inward movement of said units, a reciprocal punching needle on each of said units for perforating the overlying side walls of said pleats, means on said cylinder for actuating said needles, means carried by said units for bending tongues on said blank to extend across the base portions of the pleats from one side thereof to the other and to position the end portions of said tongues to extend outwardly transversely of said pleats, and means embodied in said needles for threading the end portions of said tongues through said pleats.

GEORGE A. BUTTRESS.